(12) United States Patent
Pleasants

(10) Patent No.: US 6,272,791 B1
(45) Date of Patent: Aug. 14, 2001

(54) DEVICE FOR DELIVERING A POISON TO A PEST

(76) Inventor: Donald A. Pleasants, 5222 Crescent Dr., Tampa, FL (US) 33611

( * ) Notice: Subject to any disclaimer, the term of this patent is extended or adjusted under 35 U.S.C. 154(b) by 0 days.

(21) Appl. No.: 09/305,592

(22) Filed: May 5, 1999

Related U.S. Application Data

(60) Provisional application No. 60/124,448, filed on Mar. 15, 1999, and provisional application No. 60/084,690, filed on May 8, 1998.

(51) Int. Cl.[7] .................................................. A01M 1/20
(52) U.S. Cl. ................................................... 43/131
(58) Field of Search ............................................ 43/131

(56) References Cited

U.S. PATENT DOCUMENTS

| | | | |
|---|---|---|---|
| 759,030 | * | 5/1904 | Sheaffer ................................ 43/131 |
| 1,309,606 | | 7/1919 | Bartholomew . |
| 1,700,517 | * | 1/1929 | Ross ..................................... 43/131 |
| 1,964,611 | * | 6/1934 | Watson ................................. 43/131 |
| 2,157,953 | | 5/1939 | DeLong . |
| 2,764,840 | * | 10/1956 | Mayfield .............................. 43/131 |
| 2,953,868 | * | 9/1960 | Chambers ............................ 43/131 |
| 3,008,262 | * | 11/1961 | Ronicker .............................. 43/131 |
| 4,541,199 | | 9/1985 | Reidinger, Jr. . |
| 4,658,536 | * | 4/1987 | Baker ................................... 43/131 |
| 5,048,225 | * | 9/1991 | Brandli ................................. 43/131 |
| 5,357,709 | * | 10/1994 | Lin ....................................... 43/131 |
| 5,501,033 | | 3/1996 | Wefler . |
| 5,943,816 | * | 8/1999 | Hyatt et al. .......................... 43/131 |

* cited by examiner

*Primary Examiner*—Kurt Rowan
(74) *Attorney, Agent, or Firm*—Frijouf Rust & Pyle, P.A.

(57) ABSTRACT

A device is disclosed for sequentially delivering of a bait and a poison to a pest comprising a base having a lower portion adapted for resting on a surface. A first and a second container portion is supported by the base for respectively retaining a bait and a poison. A cap is engageable with the base for covering the first and second container portions. The cap is movable for enabling the pest to migrate to consume the bait in the first container portions. The cap is movable for enabling the pest to migrate to consume the bait mixed with a poison in said second container portions.

5 Claims, 33 Drawing Sheets

DEVICE FOR DELIVERING A POISON TO A PEST

CROSS-REFERENCE TO RELATED APPLICATIONS

This application claims benefit of U.S. patent provisional application Ser. No. 60/084,690 filed May 8, 1998 and U.S. patent provisional application Serial No. 60/124,448 filed Mar. 15, 1999. All subject matter set forth in provisional application Ser. No. 60/084,690 filed May 8, 1998 and U.S. Patent Provisional application serial number 60/124,448 filed Mar. 15, 1999 is hereby incorporated by reference into the present application as if fully set forth herein.

BACKGROUND OF THE INVENTION

1. Field of the Invention

This invention relates to hunting, trapping and vermin destroying and more particularly to an improved device for sequentially delivering of a bait and a poison to a pest such as a vermin or an insect.

2. Background Information

Various types of devices have been provided by the prior art for the delivery of a poison to a pest such as an insect, a rodent or vermin. These devices for the delivery of poison include a single poison agent to kill the pests. The pests must voluntary consume a lethal quantity of the single poison agent to kill the pests. Those pests that are not killed after ingesting the single poison agent develop an aversion to the poison as well as an aversion for the device. The pests after developing an aversion to the poison will avoid any further ingesting of the single poison agent and any further contact with the device. Accordingly, the pests will find a alterative source of food.

In order to improve the devices for the delivery of a pest poison, a device was developed for the delivery of a sequential bait and a poison. These devices for the delivery of sequential bait and poison include two agents. A first agent consists of bait which conditions the pests to consume large quantities of the bait. A second agent consists of a poison which the pests consume after being conditioned to the bait. The conditioning of the pests to consume large quantities of the bait will lead the pests to voluntarily consume a large and lethal quantity of the poison. The use of bait to condition the pests for the poison is more effective for killing insects than a single poison agent.

Various types of devices for the delivery of insect bait and poison have been provided by the prior art. Unfortunately, the devices for the sequential delivery of a poison are either limited to the type of pests the devices attract and or the devices complexity leads to excessive manufacturing costs.

U.S. Pat. No. 1,309,606 to Bartholomew discloses an exterminator for rats and other small animals. An elongated rectangular box is provided with a removable top. A transverse partition is disposed in the box and extends from top to bottom and from side to side of the box to divide it into a small and a large compartment. The one end of the box and the partition each have in its lower edge an entrance opening. A food pan in the large compartment is located substantially in the entrance opening of the partition. The food pan contains a deadly poison which will burn the animal's feet.

U.S. Pat. No. 2,157,953 to Long discloses an insect destroyer comprising an airtight container provided with an entrance and having communicating compartments. A seal serves as the entrance. A moist poisonous bait is arranged in one of the compartments, and a moistening medium is arranged in the other compartment for keeping the bait moist after the removal of the seal. The bait is open to the atmosphere by way of the entrance and for consumption by insects.

U.S. Pat. No. 4,541,199 to Reidinger discloses a novel method and apparatus for applying materials, such as poisons or other rodent control liquids, to the dorsal fur of rodents is disclosed. The apparatus is suspended over a suspected rodent scent trail, senses the presence of a rodent in a target region located along that trail, and responsive to such sensing dispenses material from a reservoir contained in the apparatus onto a dorsal fur region of the rodent. The control materials are sequentially ingested during habitual grooming behavior. The apparatus was intended to overcome bait shyness, neophobia, and primary and conditioned taste aversions.

U.S. Pat. No. 5,501,033 to Wefler discloses a liquid delivery bait station having two reservoirs and two fluid transfer systems to allow for sequential delivery of two liquids. The liquids are preferably an insect bait-only formulation which is first delivered into an absorbent feeding pad. An insect bait-toxicant formulation is next delivered to the absorbent pad. This sequential delivery allows flying insects such as yellow jackets to be trained to the station by the bait formulation before they are exposed to the bait-toxicant formulations.

Therefore, it is an object of the present invention to provide an improved device for sequentially delivering of a bait and a poison to a pest.

Another object of this invention is to provide an improved device for sequentially delivering of a bait and a poison to a pest that is not limited to a specific type of pest.

Another object of this invention is to provide an improved device for sequentially delivering of a bait and a poison to a pest wherein the device can utilize different types of poisons.

Another object of this invention is to provide an improved device for sequentially delivering of a bait and a mixture of the bait and a poison.

Another object of this invention is to provide an improved device for sequentially delivering of a bait and a poison to a pest wherein the device is easily operated by the user.

Another object of this invention is to provide an improved device for sequentially delivering of a bait and a poison to a pest wherein the device is simple and easy to manufacture.

Another object of this invention is to provide an improved device for sequentially delivering of a bait and a poison to a pest wherein the device may be manufactured at a low cost.

Another object of this invention is to provide an improved device for sequentially delivering of a bait and a poison to a pest wherein the device is disposable.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention and the detailed description describing the preferred embodiment of the invention.

SUMMARY OF THE INVENTION

A specific embodiment of the present invention is shown in the attached drawings. For the purpose of summarizing the invention, the invention relates to an improved method and apparatus for sequentially delivering a bait and a poison to a pest comprising a base having a lower portion adapted for resting on a surface. A first and a second container portion are supported by the base. The first container is adapted to include a bait whereas the second container is adapted to include a bait mixed with a poison. A cap is movably mounted to the base for covering the first and second container portions. The cap is movable for enabling the pest to migrate to consume the bait in the first container portions. The cap is movable for enabling the pest to migrate to consume the bait mixed with a poison in the second container portions.

In one example of the invention, the cap is removably mounted to the base. In another example of the invention, the cap is rotatably mounted to the base. The cap is rotatable to a first position for enabling the pest to migrate to consume the bait in the first container portions. The cap is rotatable to a second position for enabling the pest to migrate to consume the bait mixed with a poison in the second container portions.

In another embodiment of the invention, a base has a lower portion adapted for resting on a surface with a first and a second container portion supported by the base. The first container is adapted to include a bait and the second container is adapted to include a poison. A first and a second removable closure are secured to the first and second container portions for covering the content thereof. At least one channel extends through the base for enabling the pest to migrate from the surface into proximity of the first and second container portions. A cap is removable engageable with the base for covering the first and second container portions. The first closure is removable for exposing the bait to enable the pest to migrate through the channels to consume the bait. The second closure is removable for exposing the poison to enable the pest to migrate through the channels to consume the poison after being conditioned by the consumption of the bait in the first container portion.

In a more specific embodiment of the invention, the base includes a first and a second opening to receive the first and second containers. The channel comprises an inclined ramp extending from an outer edge of the base and terminating within the base for enabling the pest to migrate from the surface into proximity of the first and second container portions. The base includes a plurality of tabs extending from the top of the base to affix the cap to the base. The tabs include a horizontal groove along the exterior face of the tabs to affix the cap to the base. The cap includes a horizontal projection along the interior edge of the cap to affix the cap to the base. The cap resiliently deforms to enable the projection of the cap to engage with the groove of the tab for affixing the cap to the base.

In one embodiment of the invention, the first and second containers include a first and a second upper lip for supporting the first and second containers from the base. The first and second containers are respectively recessed within the first and second openings of the base to enable the first and second upper lips of the first and second containers to be supported by the base.

In another embodiment of the invention, the first and second removable closures are respectively secured to the first and second upper lips of the first and second containers for covering the content thereof. The first and second removable closures are respectively pealed from the first and second upper lips of the first and second containers.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

FIGS. 1–16 are various views of a first embodiment of a device 10 for sequentially delivering of a bait 11 and a poison 12 to a pest 15. In this first embodiment of the invention, the pest 15 is shown as an ant but is should be understood that the invention may be adapted for any type of insect, rodent or the like.

In accordance with the practice of the present invention, the device 10 delivers the bait 11 to the pest 15 for conditioning the pest 15 to consume large quantities of the bait 11. After the pest 15 has been conditioned to consume large quantities of the bait 11, the device 10 delivers the poison 12 to the pest 15.

Figure 1:
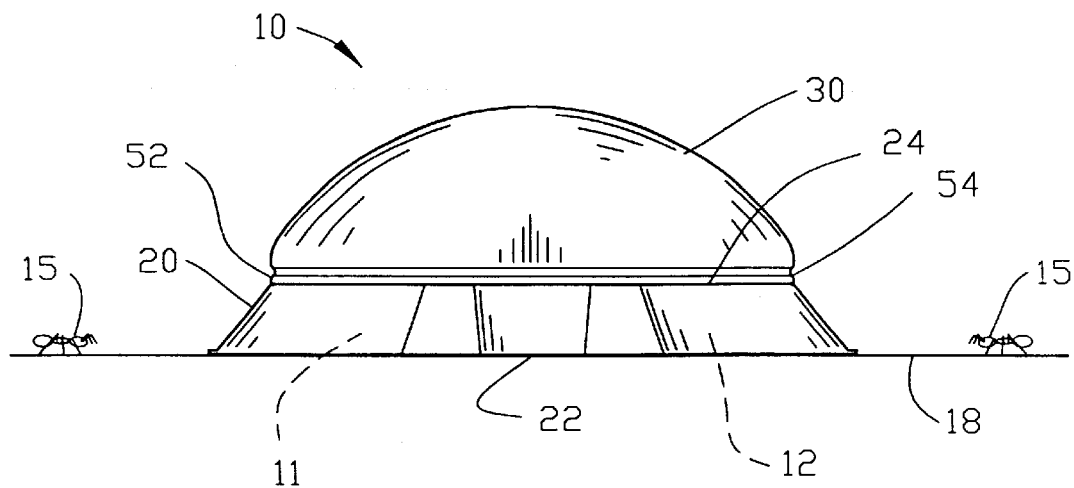
FIG. 1 is a side elevation view of a first embodiment of the invention incorporating a base and a removable cap of the present invention.
Figure 3:
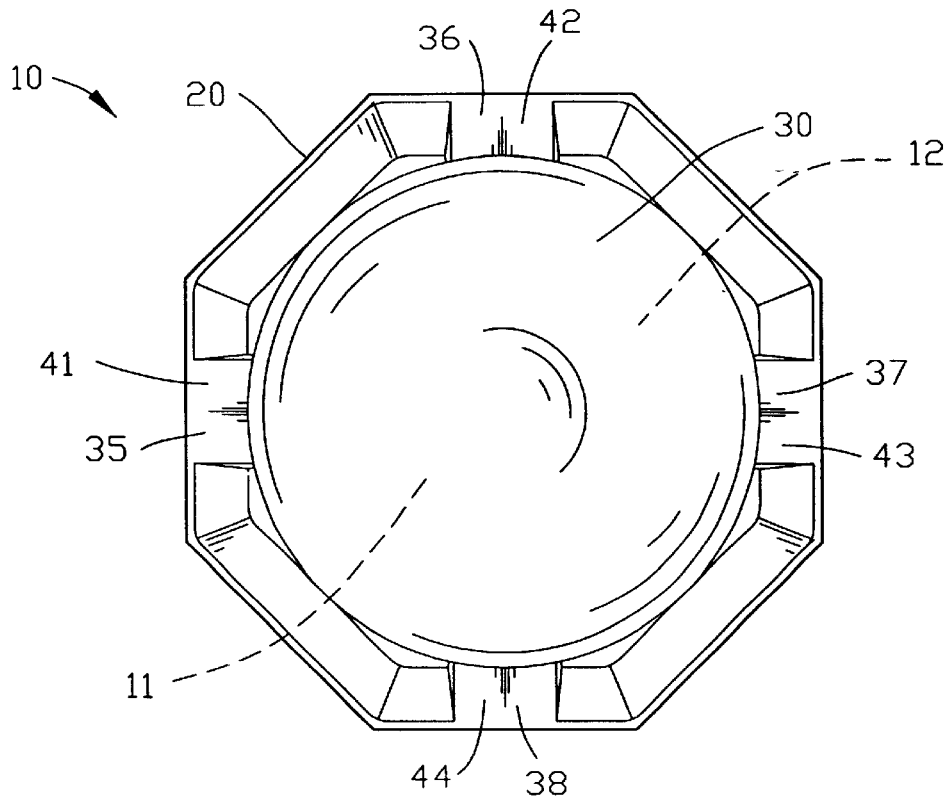
FIG. 3 is a top view of FIG. 1.

FIGS. 1 and 3 illustrate the device 10 with a base 20 supporting a cap 30. The base 20 has a lower portion 22 adapted for resting on a surface 18. The base 20 includes a top portion 24. Preferably, the base 20 is formed of a unitary polymeric material. In one example, the base 20 is formed from high impact polystyrene through a vacuum forming process. However, it should be understood that the base 20 may be formed other suitable materials such as high density polyethylene or any other suitable material.

Figure 2:
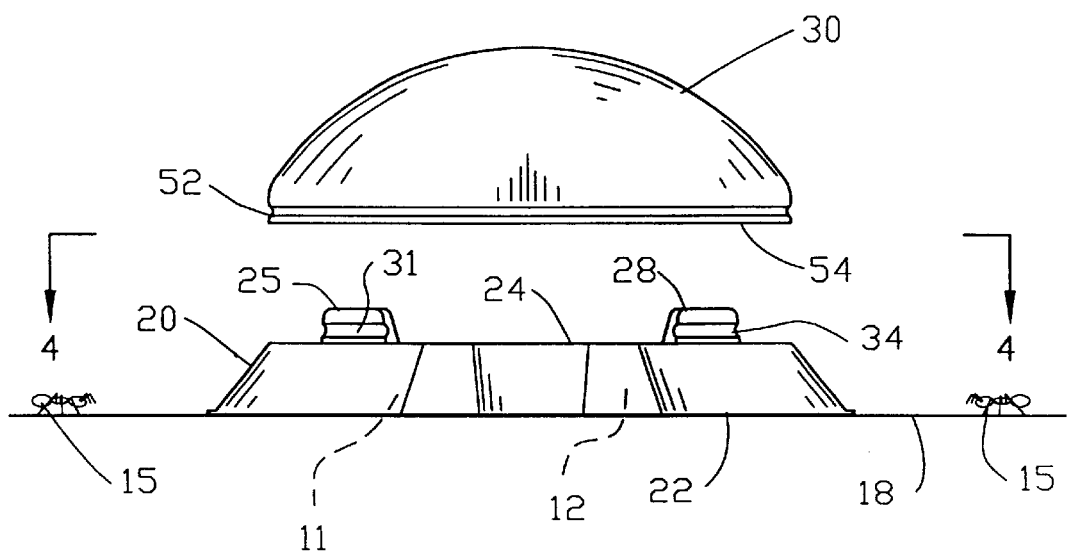
FIG. 2 is a side elevation view of the base of FIG. 1 with the removable cap being removed from the base.
Figure 4:
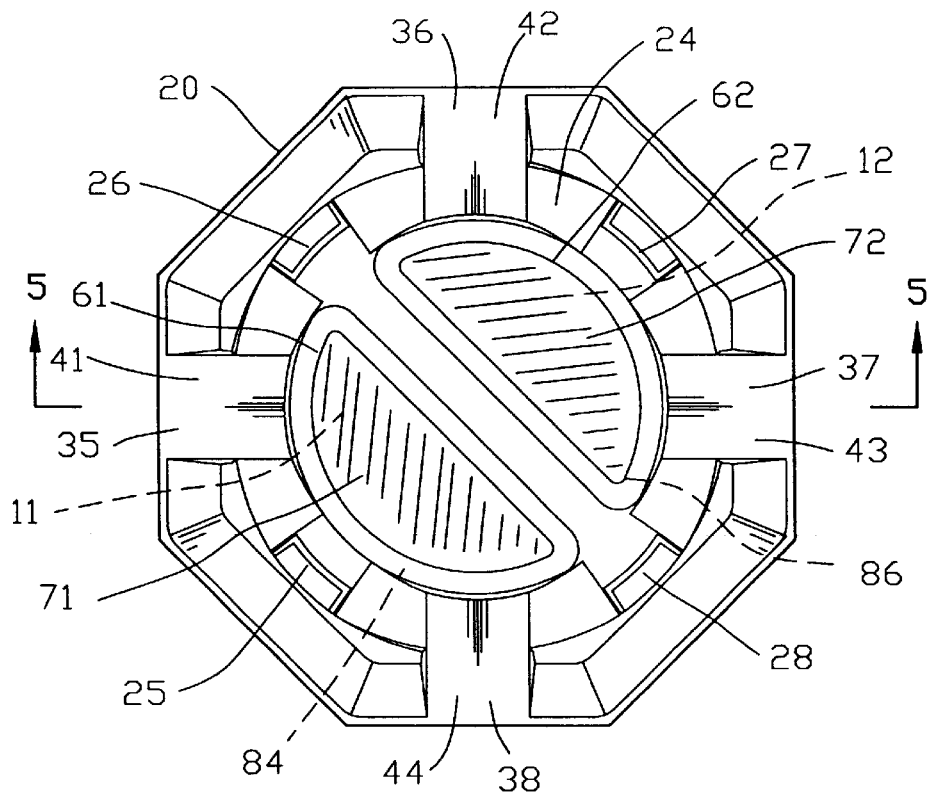
FIG. 4 is a view along line 4—4 in FIG. 2 illustrating a first and a second container with a first and a second closure thereon.

FIGS. 2 and 4 illustrate the cap 30 removed from the base 20. The base 20 includes a plurality of tabs 25–28 extending from a top portion 24 of the base 20 to affix the cap 30 to the base 20. The tabs 25–28 contain horizontal grooves 31–34 along an exterior face of each of the tabs 25–28.

The base 20 includes a plurality of channels 35–38 comprising a plurality of inclined ramps 41–44 extending from the outer edge of the lower portion 22 of the base 20 and terminating at the top portion 24 of the base 20.

The cap 30 includes a projection 52 adjacent to a bottom interior edge 54 of the cap 30. In this embodiment of the invention, the cap 30 is removably mounted to the base 20. Preferably, the cap 30 is formed of a unitary resilient polymeric material. In one example, the cap 30 is formed from biaxially oriented polystyrene through a vacuum forming process. However, it should be understood that the cap 30 may be formed other suitable materials such as amorphous polyethylene terephtlate, a vinyl chloride such as polyvinyl chloride any other suitable material.

The cap 30 resiliently deforms to enable the projection 52 of the cap 30 to be engaged with the grooves 31–34 of the tabs 25–28 for affixing the cap 30 to the base 20. The resiliency of the cap 30 enables the cap 30 to be disengaged with the grooves 31–34 of the tabs 25–28 for removing the cap 30 from the base 20.

Figure 5:
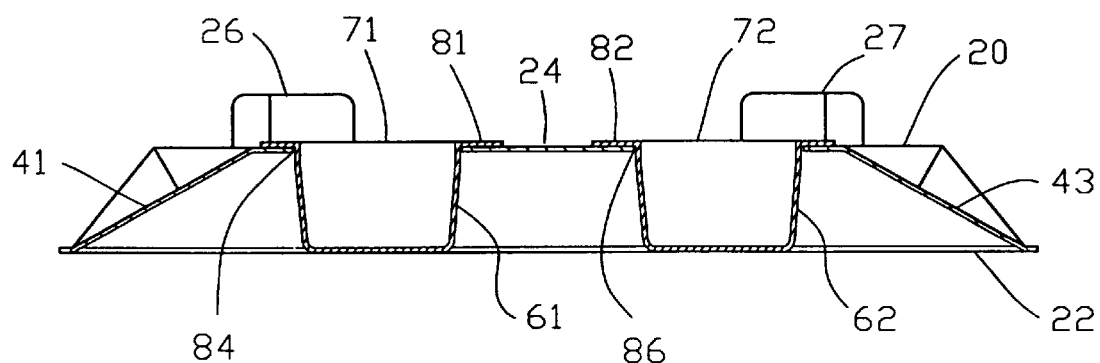
FIG. 5 is an enlarged sectional view along line 5—5 in FIG. 4 illustrating the base with the first and second containers and the first and second closures thereon.
Figure 6:
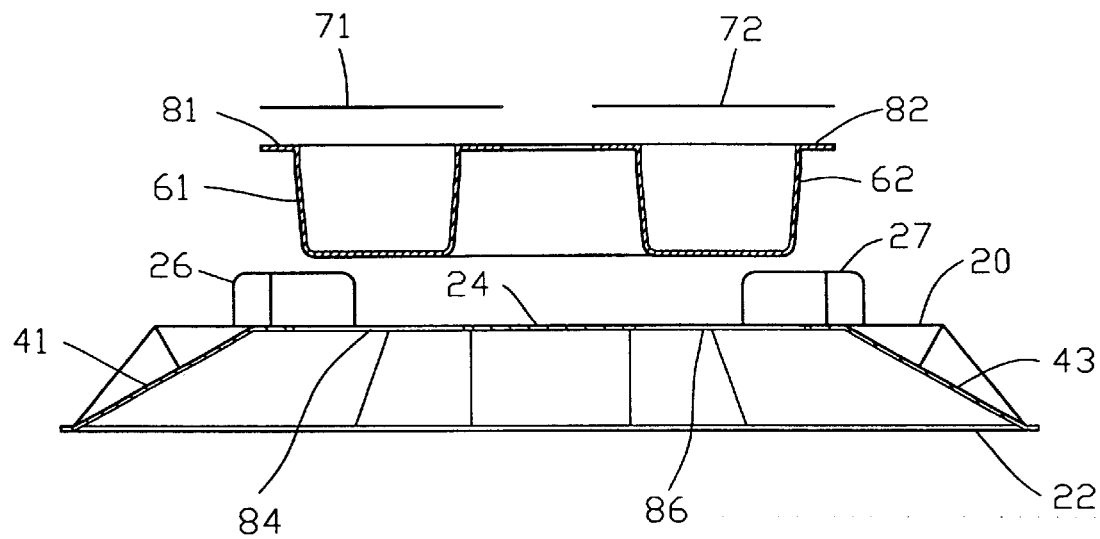
FIG. 6 is a view similar to FIG. 5 illustrating the removal of the first and second closures from the first and second containers and the removal of the first and the second containers from the base.

FIGS. 5 and 6 illustrate the top portion 24 of the base 20 supporting a first container 61 and a second container 62. The first container 61 contains a bait 11 whereas the second container 62 contains a poison 12. The poison 12 may include a portion of a bait 11 mixed with the poison 12 for the purpose of continued attraction of the pest 15. Preferably, the bait 11 mixed with the poison 12 is the same bait 11 used previously for conditioning the pest 15.

The first and second containers 61 and 62 are covered respectively by a first and a second closure 71 and 72. The first and second closures 71 and 72 conceal the bait 11 and the poison 12. Preferably, the first and second closures 71 and 72 are secured to the first and second containers 61 and 62 by a conventional adhesive. The conventional adhesive enables the first and second closures 71 and 72 to be pealed away from the first and second containers 61 and 62 to expose the content thereof.

The first and second containers 61 and 62 include a first and a second upper lip 81 and 82 for supporting the first and second containers 61 and 62 in the base 20. The first and second containers 61 and 62 are received within a first and a second opening 84 and 86 defined within the base 20. The first and second containers 61 and 62 are received within the first and second openings 84 and 86 while the first and second upper lips 81 and 82 engage with the top portion 24 of the base 20.

In the embodiment of the invention, the first and second removable closures 71 and 72 are respectively secured to the first and second upper lips 81 and 82 of the first and second containers 61 and 62. Preferably, the first and second closures 71 and 72 are secured to the first and second upper lips 81 and 82 by a conventional adhesive. The first and second removable closures 71 and 72 may be individually pealed from the first and second upper lips 81 and 82 of the first and second containers 61 and 62.

Figure 7:
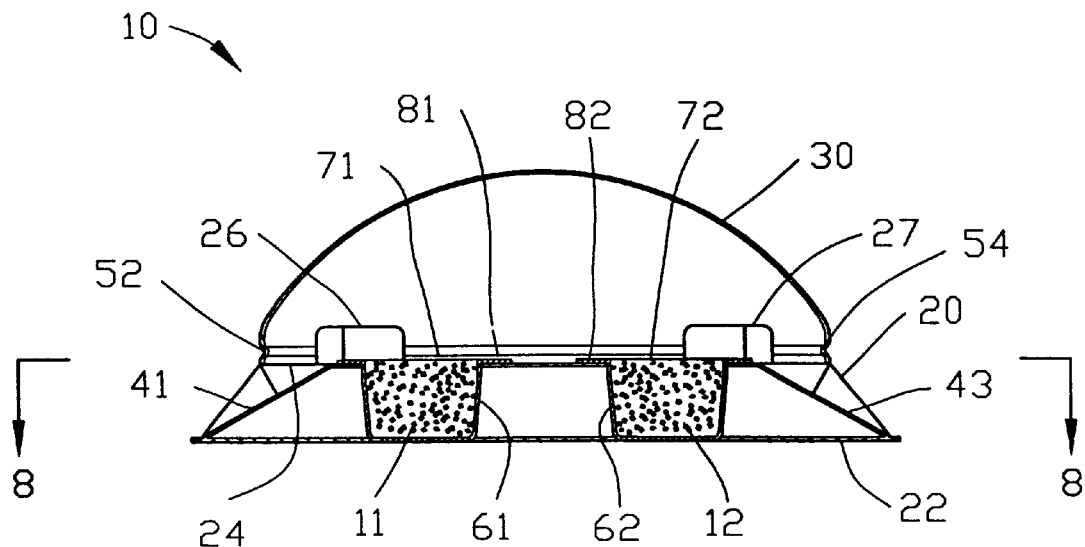
FIG. 7 is a sectional view illustrating the first container containing a bait and the second container containing a bait mixed with a poison.
Figure 8:
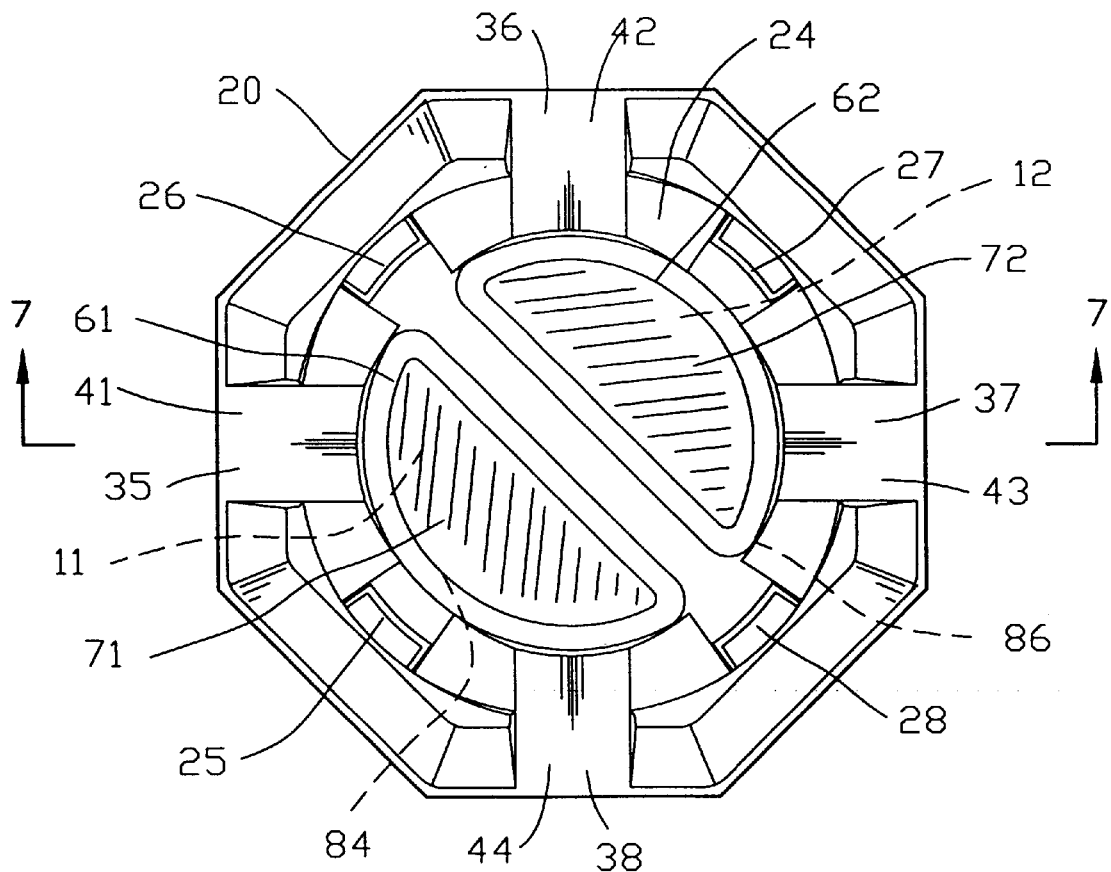
FIG. 8 is a view along line 8—8 in FIG. 7.

FIGS. 7 and 8 illustrates the cap 30 affixed to the base 20. The first container 61 contains a bait 11 which conditions the pests to consume large quantities of the bait 11. The second container 62 contains a poison 12 which the pest 15 consumes after being conditioned to the bait 11. The conditioning of the pest 15 to consume large quantities of the bait 11 will lead the pest 15 to voluntary consume a large and lethal quantity of the poison 12. The first and second removable closures 71 and 72 are secured to the first and second upper lips 81 and 82 of the first and second containers 61 and 62.

Figure 9:
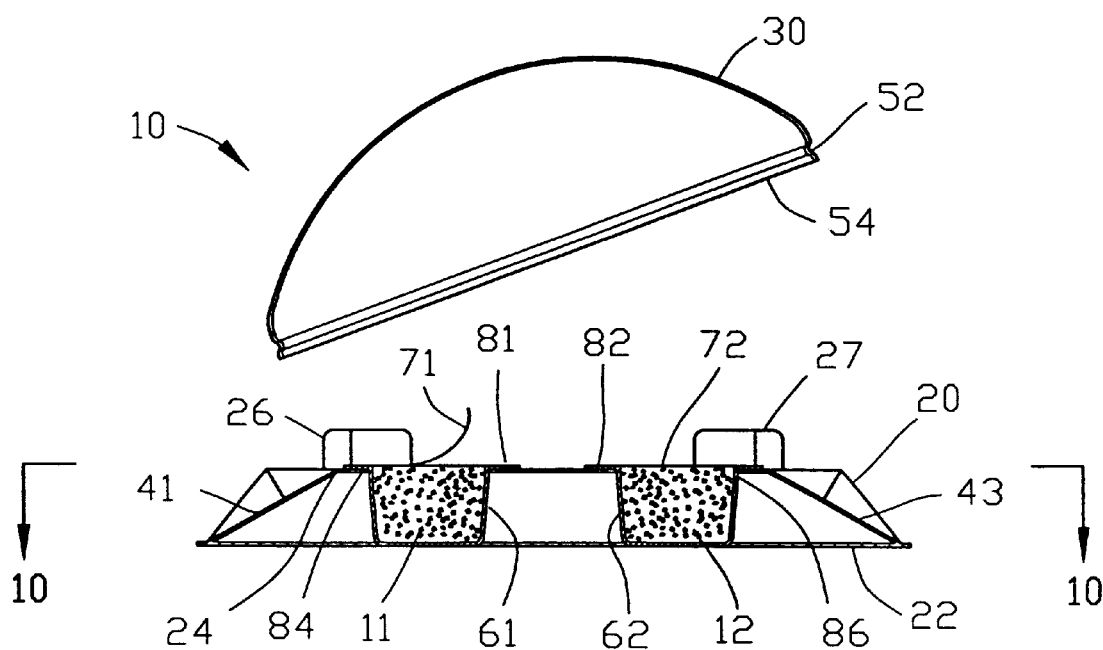
FIG. 9 is a sectional view similar to FIG. 7 illustrating the removal of the removable cap from the base and the partial pealing of the first closure from the first container.
Figure 10:
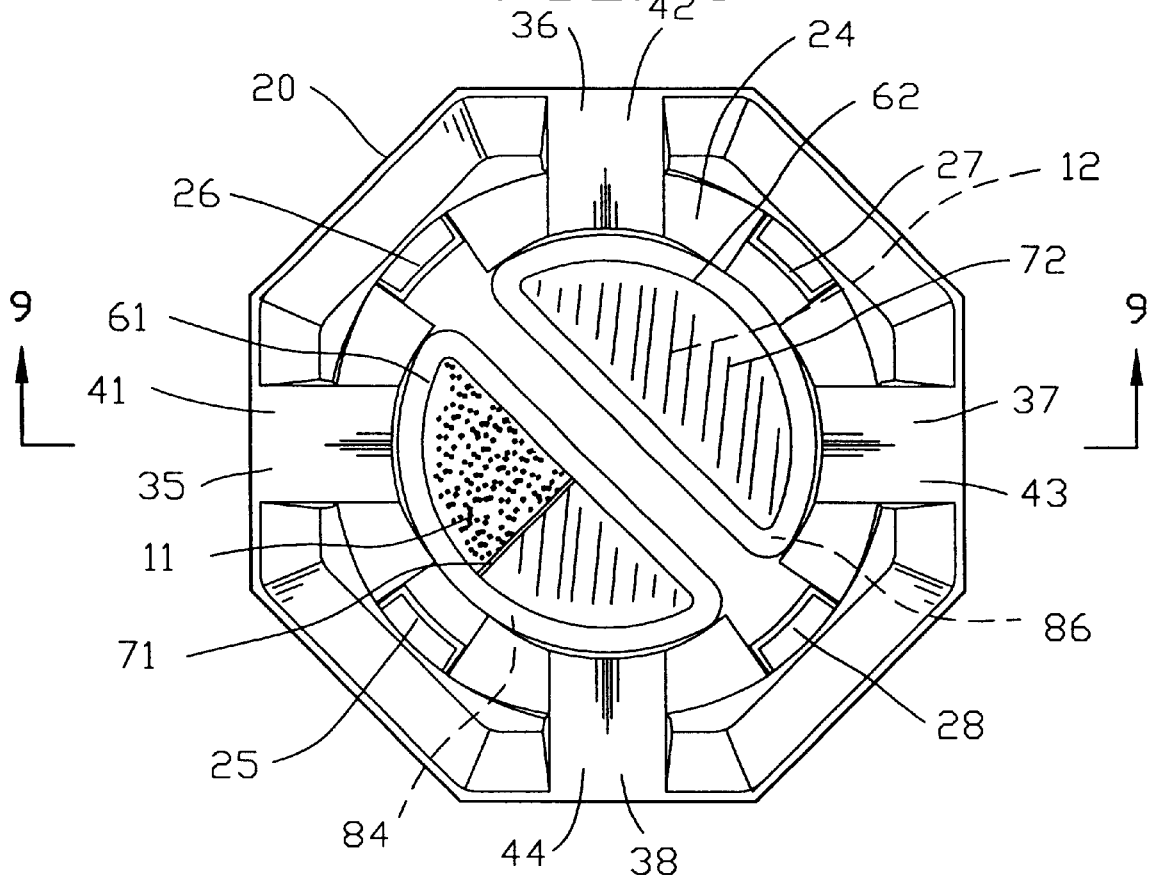
FIG. 10 is a view along line 10—10 in FIG. 9.

FIGS. 9 and 10 illustrates the first step for the subsequent delivery of the bait 11 and the poison 12 to the pest 15. The cap 30 is resiliently deformed to enable the projection 52 of the cap 30 to be disengaged with the grooves 31–34 of the tabs 25–28 to remove the cap 30 from the base 20. After the cap 30 is removed from the base 20, the first removable closure 71 is pealed from the first upper lip 81 of the first container 61. The first removable closure 71 is removed completely from the first container 61 to expose the bait 11 within the first container 61.

Figure 11:
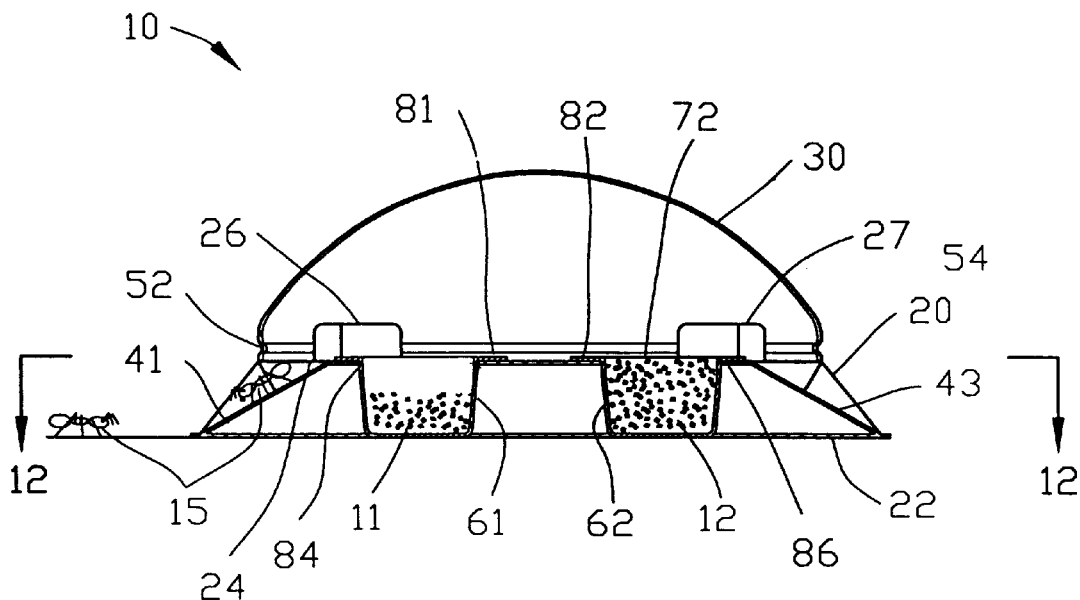
FIG. 11 is a sectional view similar to FIG. 7 illustrating the exposed bait in the first container for attracting insects.
Figure 12:
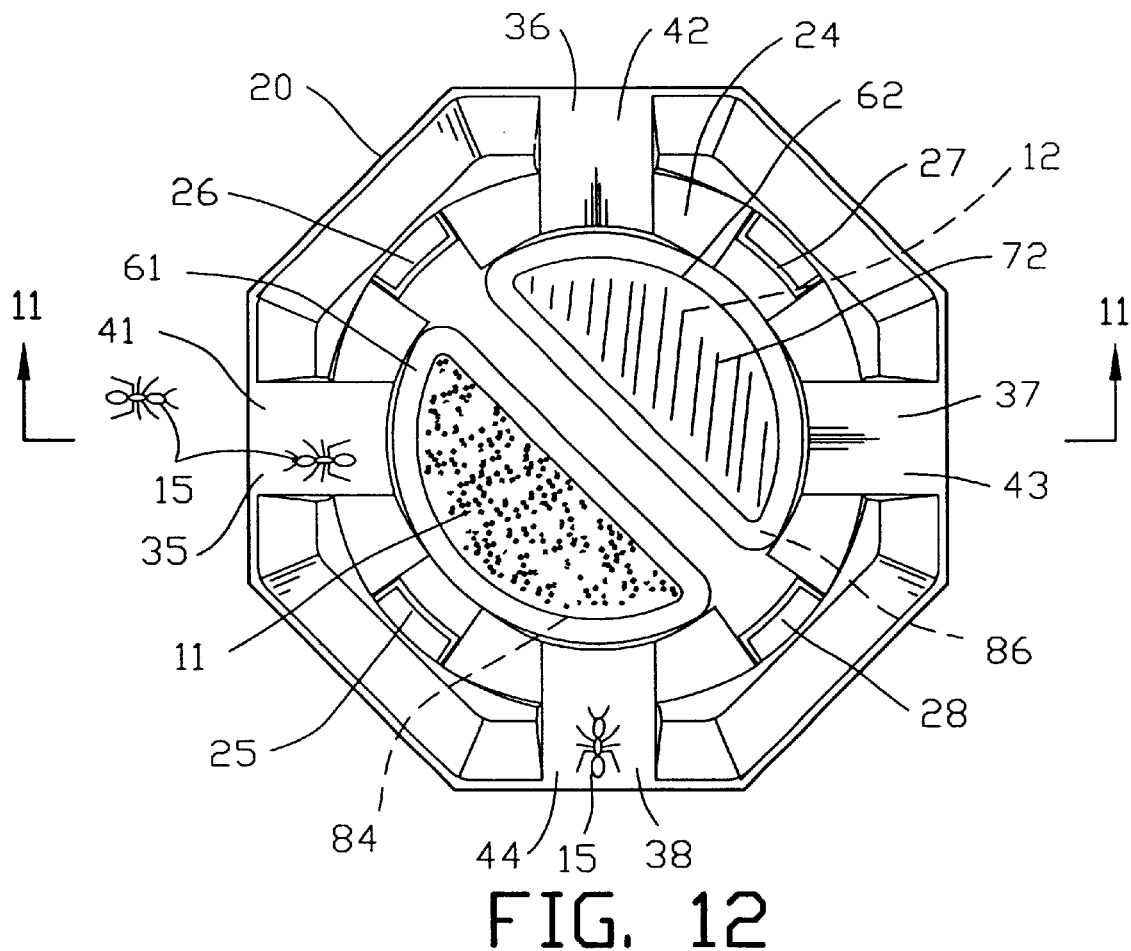
FIG. 12 is a view along line 12—12 in FIG. 11.

FIGS. 11 and 12 illustrates the second step for the subsequent delivery of the bait 11 and the poison 12 to the pest 15. The cap 30 is resiliently deformed to enable the projection 52 of the cap 30 to be engage with the grooves 31–34 of the tabs 25–28 to affix the cap 30 from the base 20. The channels 35–38 comprising inclined ramps 41–44 enable the pest 15 to migrate into the cap 30 to consume the exposed bait 11 within the first container 61. The bait 11 is shown partially consumed for conditioning of the pests 15 to consume large quantities of the bait 11.

Figure 13:
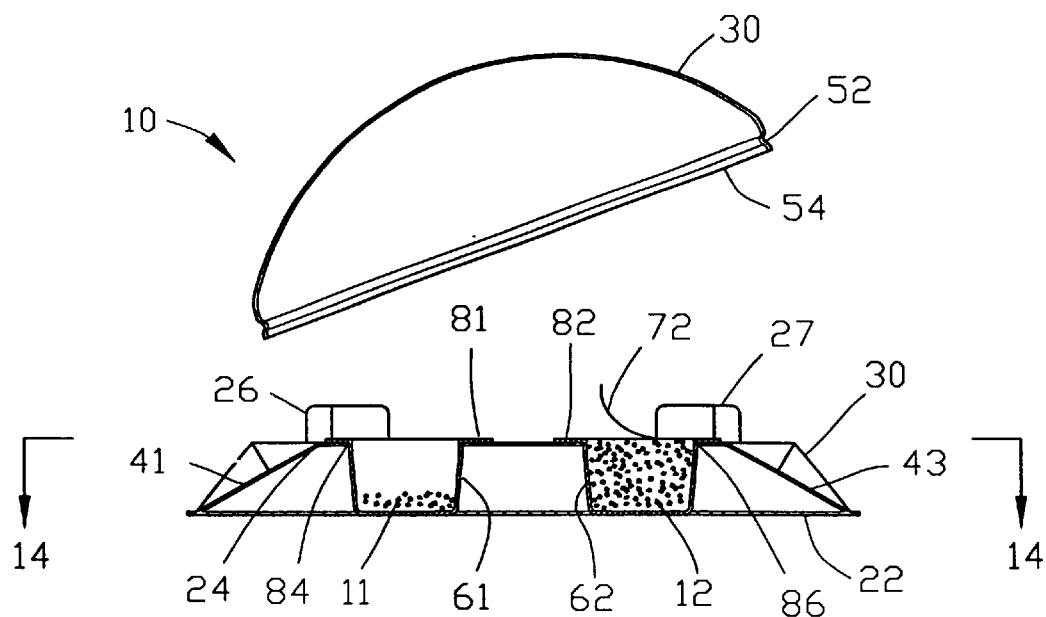
FIG. 13 is a sectional view similar to FIG. 7 illustrating the removal of the removable cap from the base and the partial pealing of the second closure from the second container.
Figure 14:
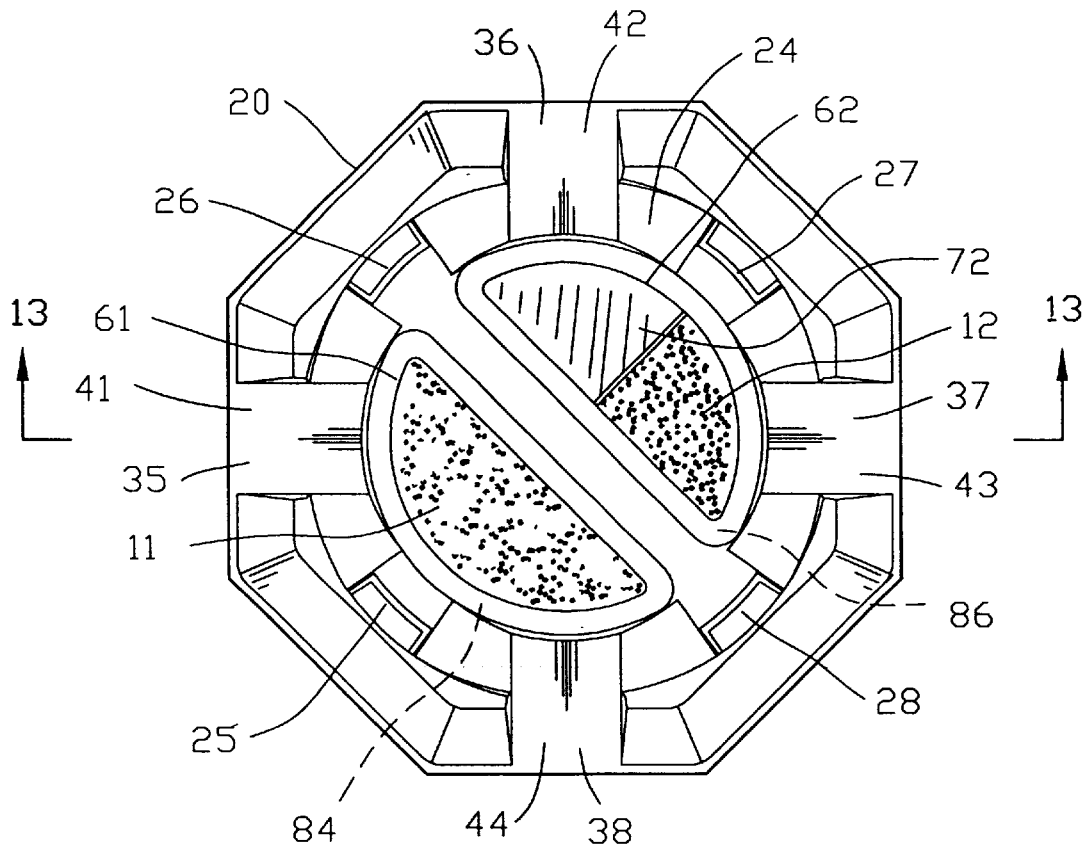
FIG. 14 is a view along line 14—14 in FIG. 13.

FIGS. 13 and 14 illustrates the third step for the subsequent delivery of the bait 11 and the poison 12 to the pest 15. The cap 30 is resiliently deformed to remove the cap 30 from the base 20. After the cap 30 is removed from the base 20, the second removable closure 72 is pealed from the second upper lip 82 of the second container 62. The second removable closure 72 is removed completely from the second container 62 to expose the poison 12 within the second container 62.

Figure 15:
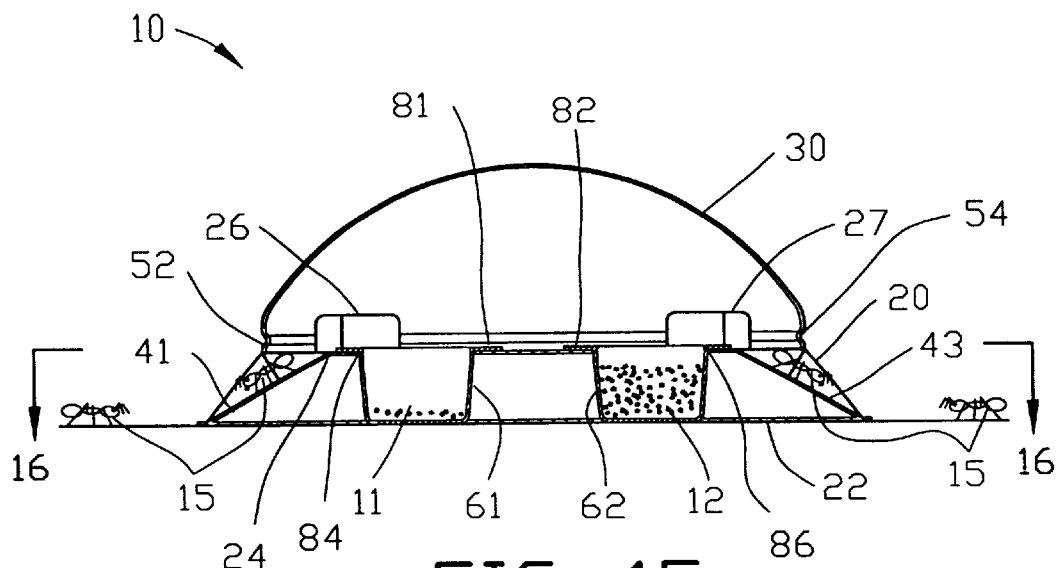
FIG. 15 is a sectional view similar to FIG. 11 illustrating the exposed bait mixed with a poison in the second container for attracting and poisoning insects.
Figure 16:
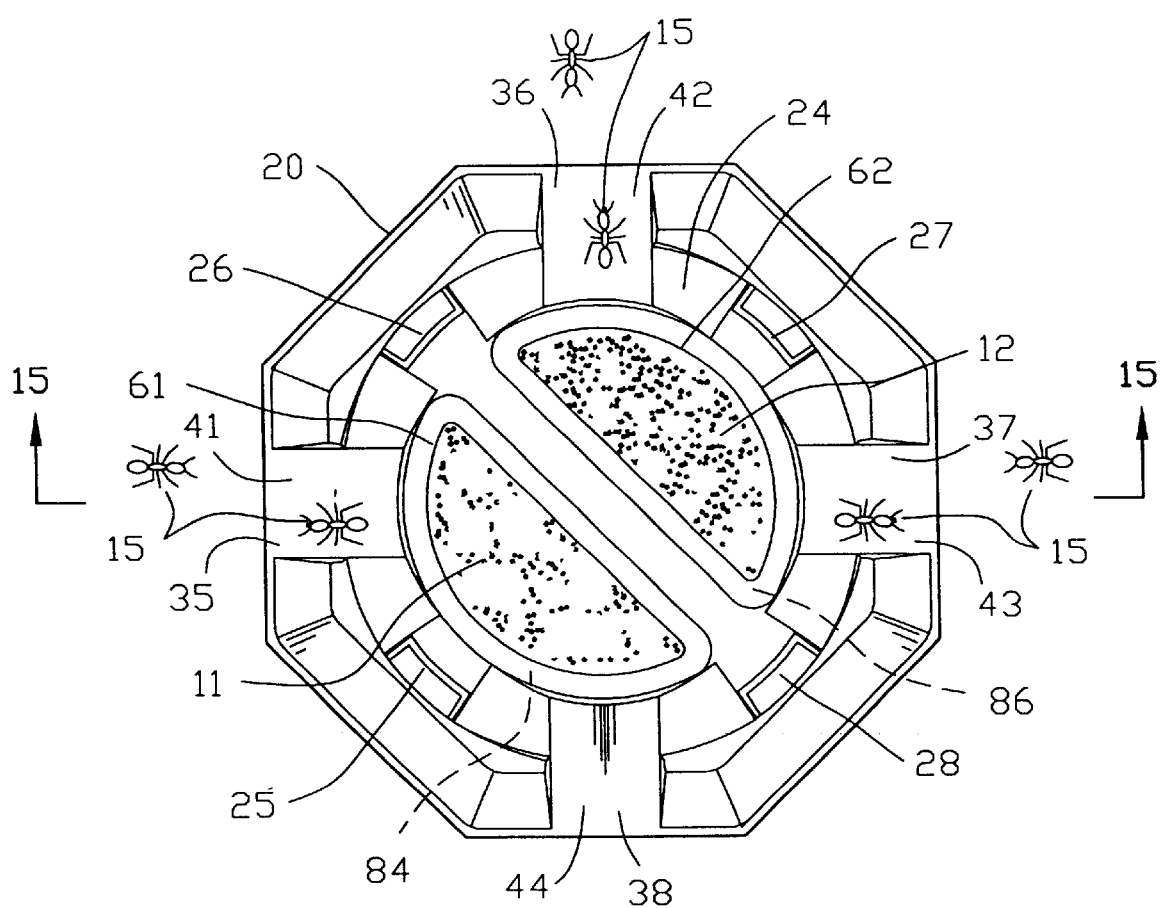
FIG. 16 is a view along line 16—16 in FIG. 15.

FIGS. 15 and 16 illustrates the fourth step for the subsequent delivery of the bait 11 and the poison 12 to the pest 15. The cap 30 is resiliently deformed to affix the cap 30 from the base 20. The channels 35–38 comprising inclined ramps 41–44 enable the pest 15 to migrate into the cap 30 to consume the exposed poison 12 within the second container 62. The poison 12 is shown partially consumed for delivering a large and lethal quantity of the poison 12 to the pest 15. The large and lethal quantity of the poison 12 delivered to the pest 15 is a result of the conditioning of the pest 15 to consume large quantities of the bait 11 from the first container 61. In some instances, the entire quantity of the bait 11 from the first container 61 is allowed to be depleted prior to the removal of the second removable closure 72 from the second container 62.

FIGS. 17–30 are various views of a second embodiment of a device 110 for sequentially delivering of a bait 11 and a poison 12 to a pest 15. The device 110 comprises a base 120 supporting a cap 130.

Figure 17:
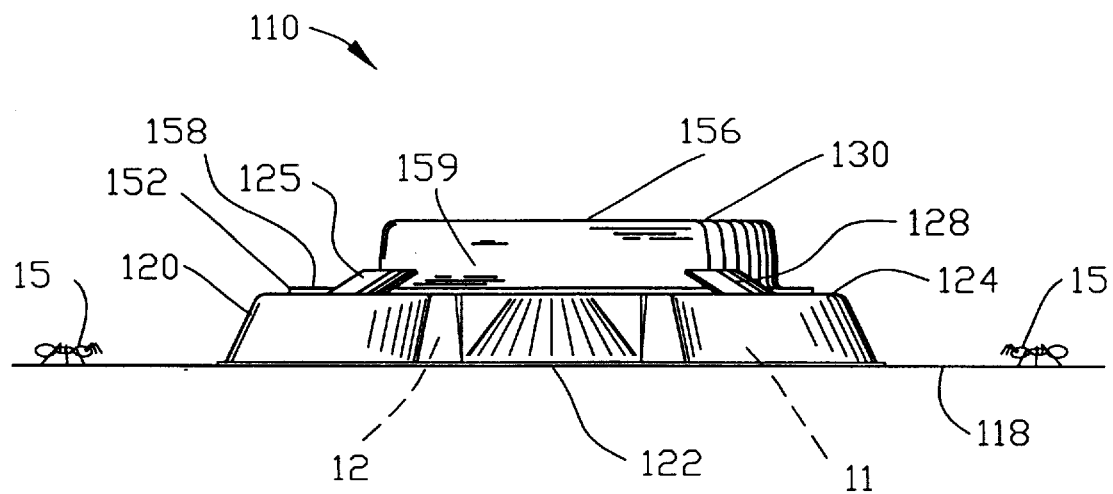
FIG. 17 is a side elevation view of a second embodiment of the invention incorporating a base and a removable cap of the present invention.
Figure 19:
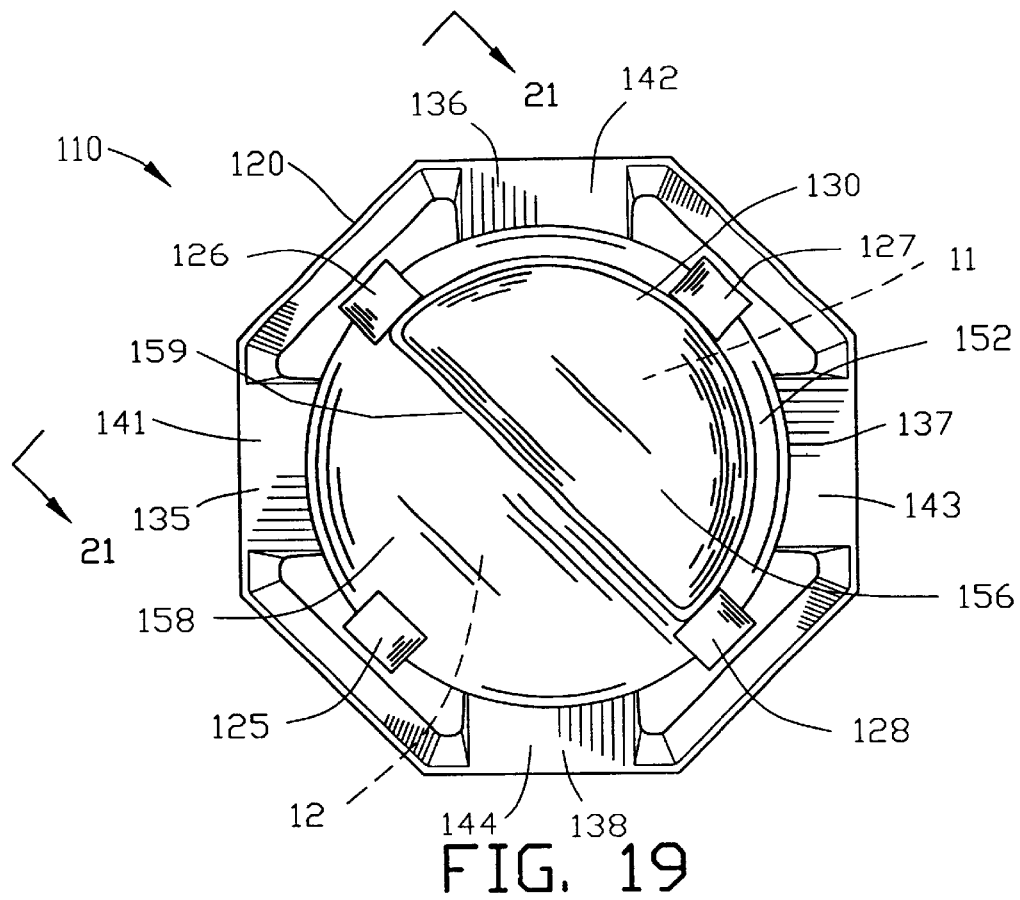
FIG. 19 is a top view of FIG. 17.

FIGS. 17 and 19 illustrate the device 110 with the base 120 supporting a cap 130. The base 120 has a lower portion 122 for resting on a surface 118 and a top portion 124. Preferably, the base 120 is formed of a unitary polymeric material through a vacuum forming process.

Figure 18:
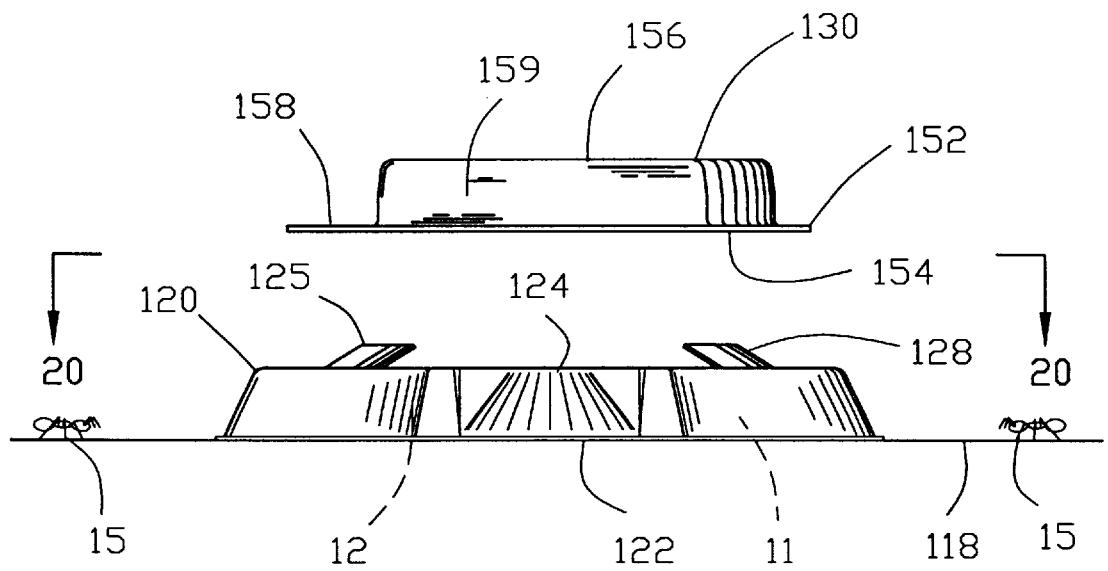
FIG. 18 is a side elevation view of the base of FIG. 17 with the removable cap being removed from the base.
Figure 20:
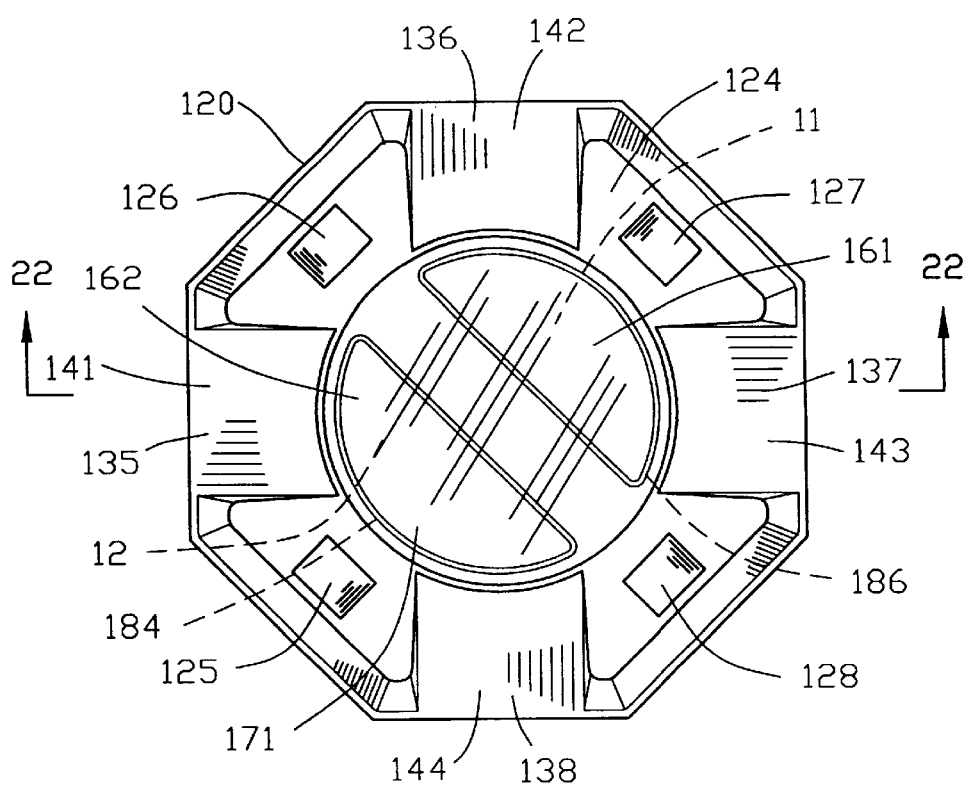
FIG. 20 is a view along line 20—20 in FIG. 18 illustrating a first and a second container with a common closure thereon.

FIGS. 18 and 20 illustrate the cap 130 removed from the base 120. In this embodiment of the invention, the cap 130 is removably mounted to the base 120. In addition, the cap 130 is rotatably mounted to the base 120.

The base 120 includes a plurality of resilient tabs 125–128 extending from a top portion 124 of the base 120 to affix the cap 130 to the base 120. The plurality of resilient tabs 125–128 may be die cut from the top portion 124 of the base 120.

The plurality of resilient tabs 125–128 resiliently deform to enable the projection 152 of the cap 130 to be engaged between the plurality of resilient tabs 125–128 and the top portion 124 of the base 120 for affixing the cap 130 to the base 120. The resiliency of the plurality of resilient tabs 125–128 enables the cap 130 to be disengaged from the plurality of resilient tabs 125–128 for removing the cap 130 from the base 120.

The plurality of resilient tabs 125–128 rotatably mount the cap 130 relative to the base 120. The cap 130 may be rotated relative to the base 120 for sequentially delivering of the bait 11 and the poison 12 to the pest 15.

The base 120 includes a plurality of channels 135–138 comprising a plurality of inclined ramps 141–144 extending from the outer edge of the lower portion 122 of the base 120 and terminating at the top portion 124 of the base 120.

Figure 21:
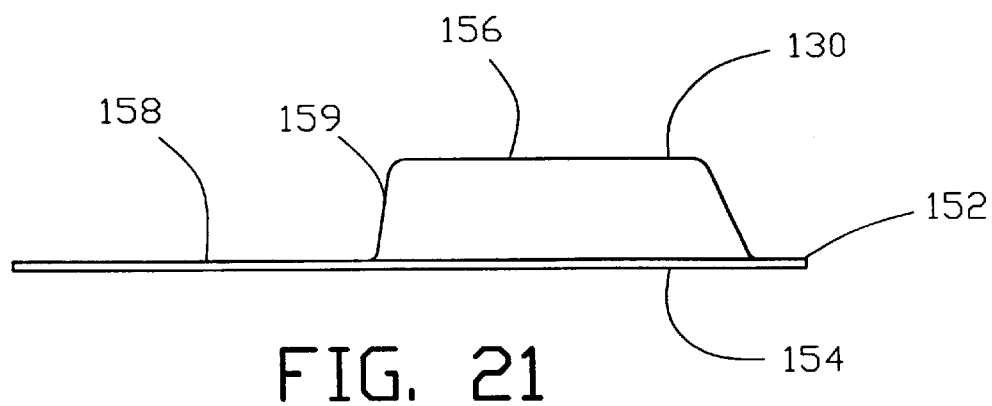
FIG. 21 is an enlarged view along line 21—21 in FIG. 19 illustrating the removable cap.

FIG. 21 is an enlarged sectional view along line 21—21 in FIG. 19 illustrating the removable cap 130. A projection 152 is defined at a bottom exterior edge 154 of the cap 130. The cap 130 includes an elevated region 156 and a lower region 158. The elevated region 156 extends at a level above the level of the bottom exterior edge 154 of the cap 130. The lower region 158 extends at a level commensurate with the level of the bottom exterior edge 154 of the cap 130. Preferably, the cap 130 is formed of a unitary polymeric material through a vacuum forming process.

A vertical face 159 interconnects the elevated region 156 and the lower region 158. Furthermore, the elevated region 156 occupies approximately half of the area of the cap 130. The elevated region 156, the lower region 158 and the vertical face 159 performs two functions. Firstly, the appearance of the elevated region 156 occupying only one-half of the area of the cap 130 visually informs an operator that the cap 130 must be rotated to properly utilize the device 110 of the present invention. Secondly, the vertical face 159 provides a surface for placing a finger or a thumb by the operator for facilitating the rotation of the cap 130 relative to the base 120.

Figure 22:
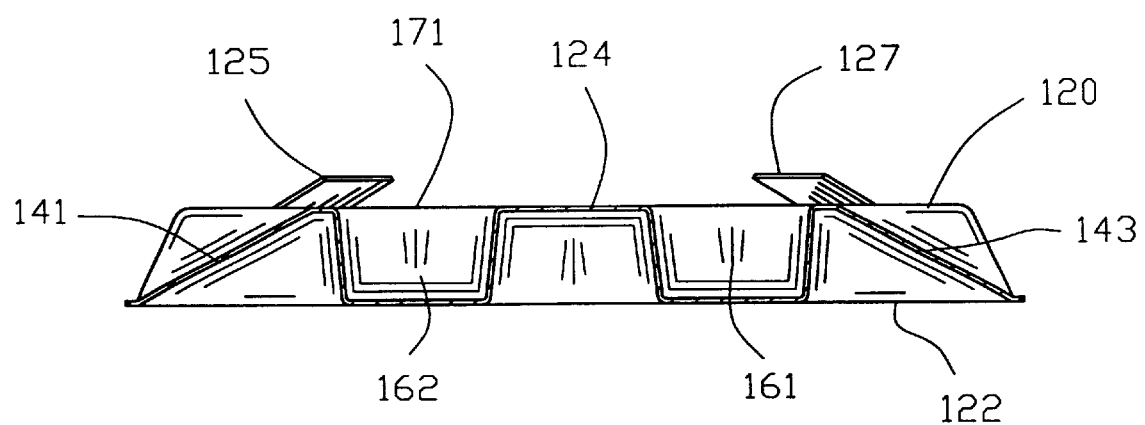
FIG. 22 is an enlarged sectional view along line 22—22 in FIG. 20 illustrating the base and the first and second containers with the common closure thereon.

FIG. 22 illustrates the base 120 supporting a first container 161 and a second container 162. The first container 161 contains a bait 11 whereas the second container 162 contains a poison 12. The first and second containers 161 and 162 are covered by a common closure 171. The common closure 171 simultaneously conceal the bait 11 and the poison 12. Preferably, the common closure 171 is secured to the first and second containers 161 and 162 by a conventional adhesive. The conventional adhesive enables the common closure 171 to be pealed away from the first and second containers 161 and 162 to expose the content thereof. In this embodiment of the invention, the first and second containers 161 and 162 are formed integrally within the top surface 124 of the base 120.

Figure 23:
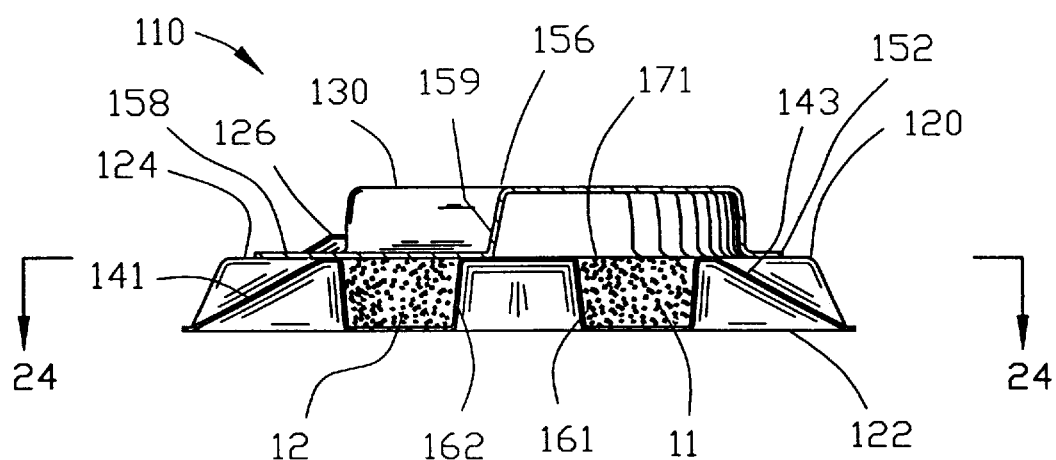
FIG. 23 is a sectional view illustrating the first container containing a bait and the second container containing a bait mixed with a poison.
Figure 24:
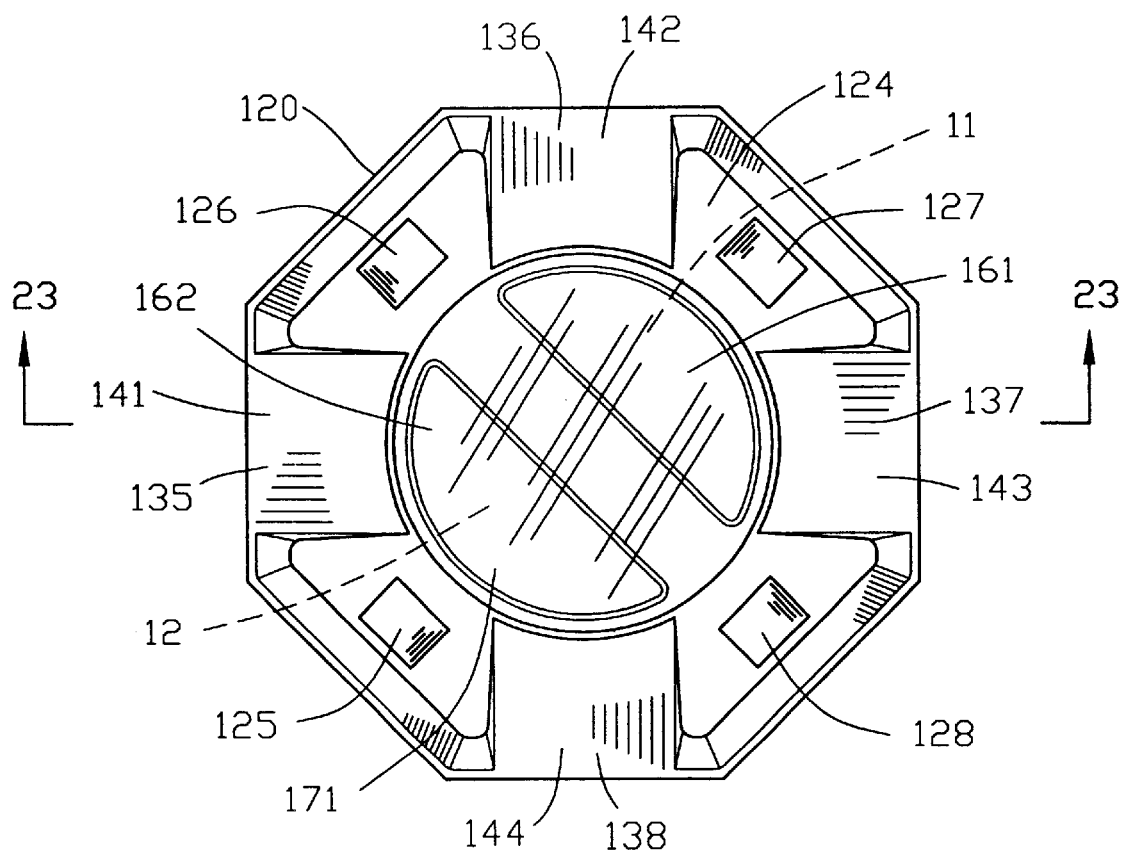
FIG. 24 is a view along line 24—24 in FIG. 23.

FIGS. 23 and 24 illustrates the cap 130 affixed to the base 120. The first container 161 contains a bait 11 whereas the second container 162 contains a poison 12. The common closure 171 is secured to the first and second containers 161 and 162.

Figure 25:
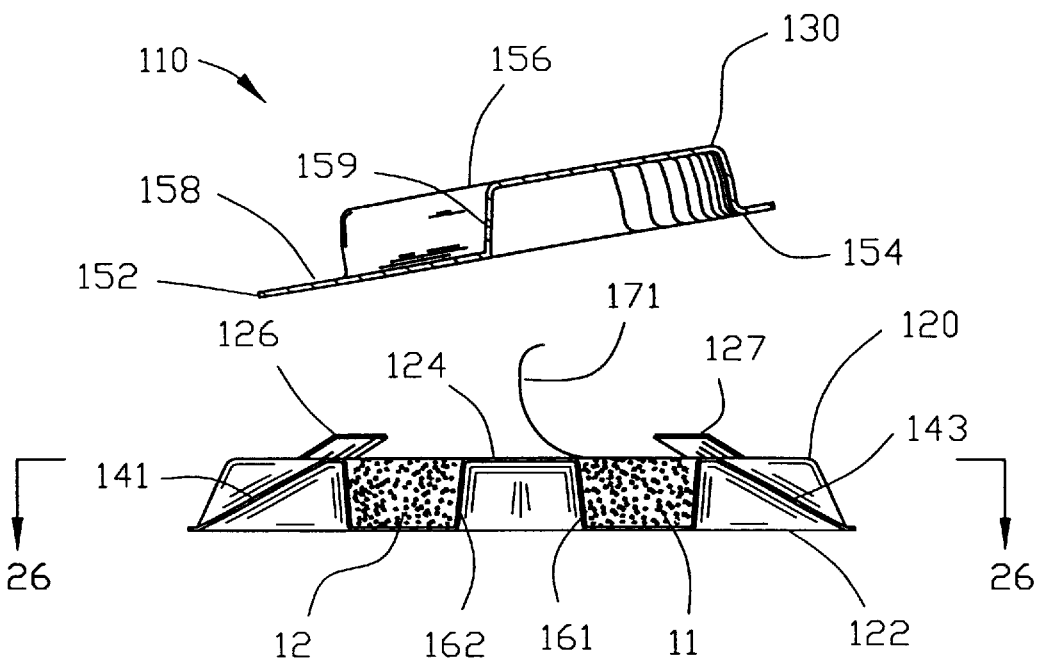
FIG. 25 is a sectional view similar to FIG. 23 illustrating the removal of the removable cap from the base and the partial pealing of the common closure from the first and second containers.
Figure 26:
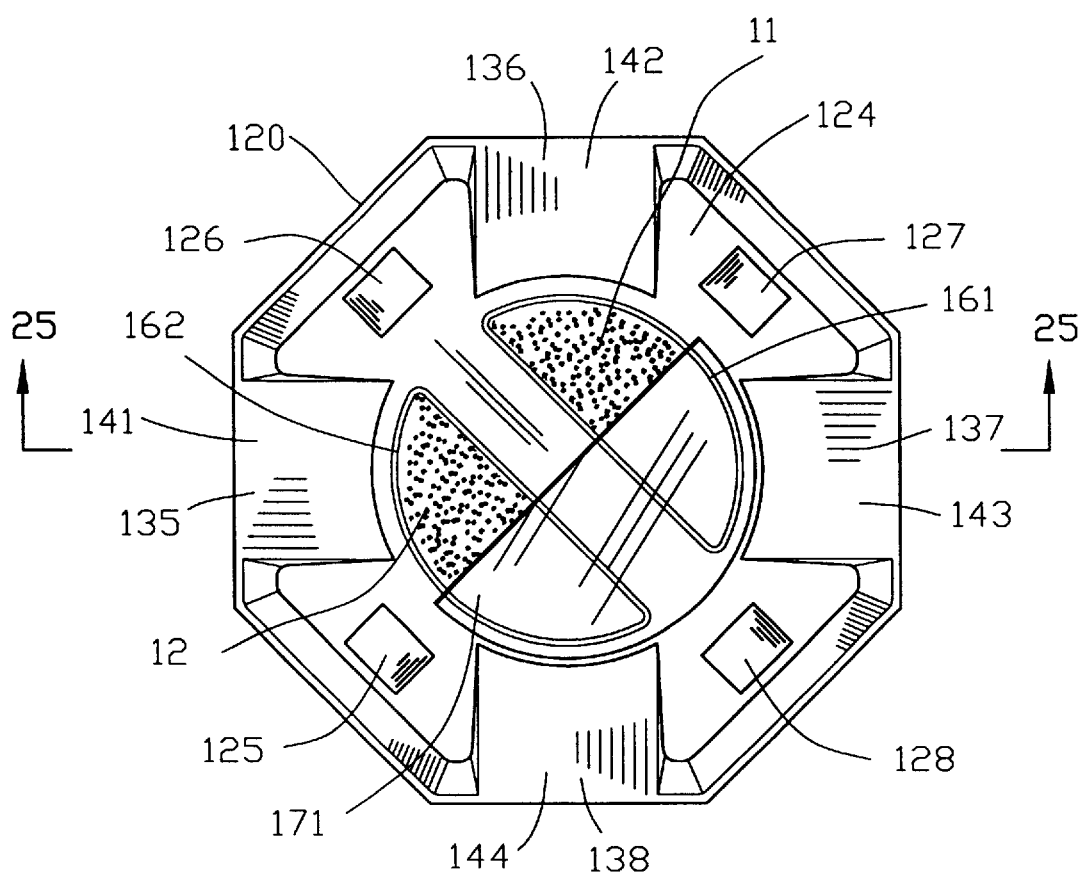
FIG. 26 is a view along line 26—26 in FIG. 25.

FIGS. 25 and 26 illustrates the first step for the subsequent delivery of the bait 11 and the poison 12 to the pest 15. The plurality of resilient tabs 125–128 are resiliently deformed to enable the projection 152 of the cap 130 to be disengaged from the plurality of resilient tabs 125–128 and the top portion 124 of the base 120 for removing the cap 130 to the base 120. After the cap 130 is removed from the base 120, the common closure 171 is pealed from the first and second containers 161 and 162. The common closure 171 is removed completely from the first and second containers 161 and 162 to expose the bait 11 and the poison within the first and second containers 161 and 162.

Figure 27:
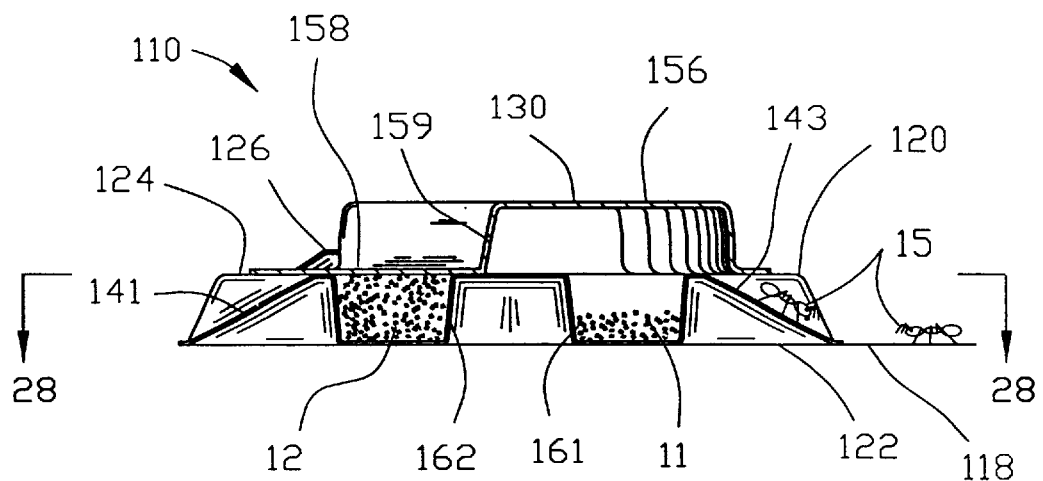
FIG. 27 is a sectional view similar to FIG. 23 illustrating the removable cap being rotated into a first position to expose the bait in the first container for attracting insects.
Figure 28:
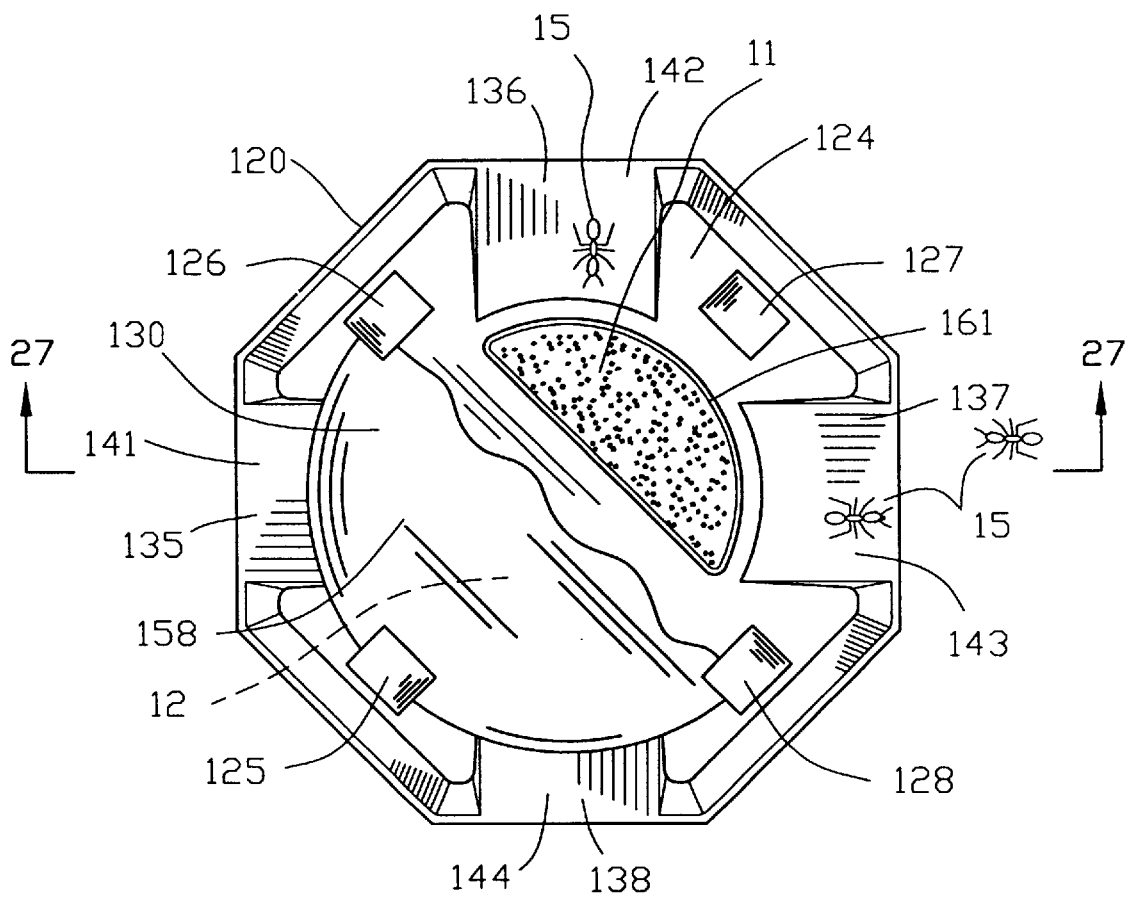
FIG. 28 is a view along line 28—28 in FIG. 27.

FIGS. 27 and 28 illustrates the second step for the subsequent delivery of the bait 11 and the poison 12 to the pest 15. The plurality of resilient tabs 125–128 are resiliently deformed to enable the projection 152 of the cap 130 to be engaged between the plurality of resilient tabs 125–128 and the top portion 124 of the base 120 for affixing the cap 130 to the base 120.

The plurality of resilient tabs 125–128 rotatably mount the cap 130 relative to the base 120. The cap 130 is rotated into the rotational position shown in FIG. 27 and 28 whereat the elevated region 156 of the cap 130 cooperates with the top portion 124 of the base 120 to expose the first container 171 containing the bait 11. The lower region 158 of the cap 130 cooperates with the top portion 124 of the base 120 to cover the second container 172 containing the poison 12.

The channels 135–138 comprising inclined ramps 141–144 enable the pest 15 to migrate into the elevated region 156 of the cap 130 to consume the exposed bait 11 within the first container 161. The bait 11 is shown partially consumed for conditioning of the pests 15 to consume large quantities of the bait 11.

Figure 29:
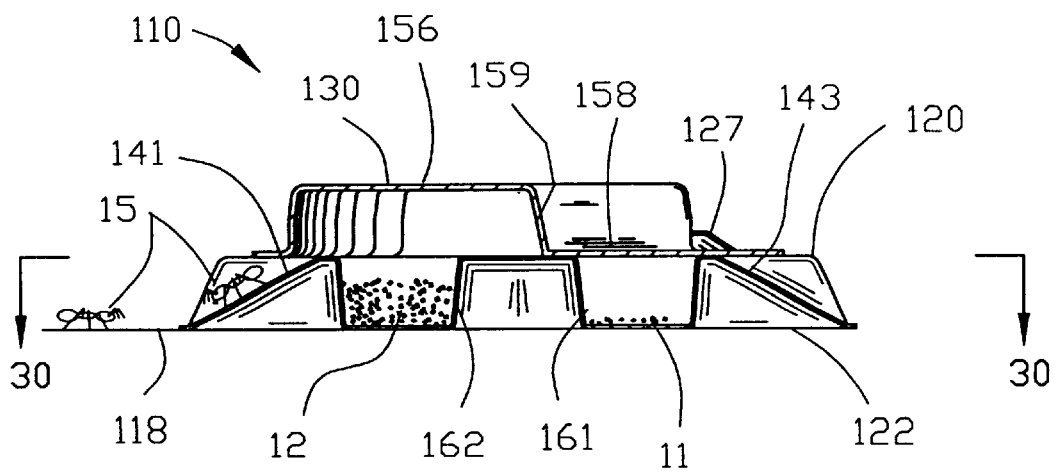
FIG. 29 is a sectional view similar to FIG. 27 illustrating the removable cap being rotated into a second position to expose the bait mixed with the poison in the second container for attracting and poisoning insects.
Figure 30:
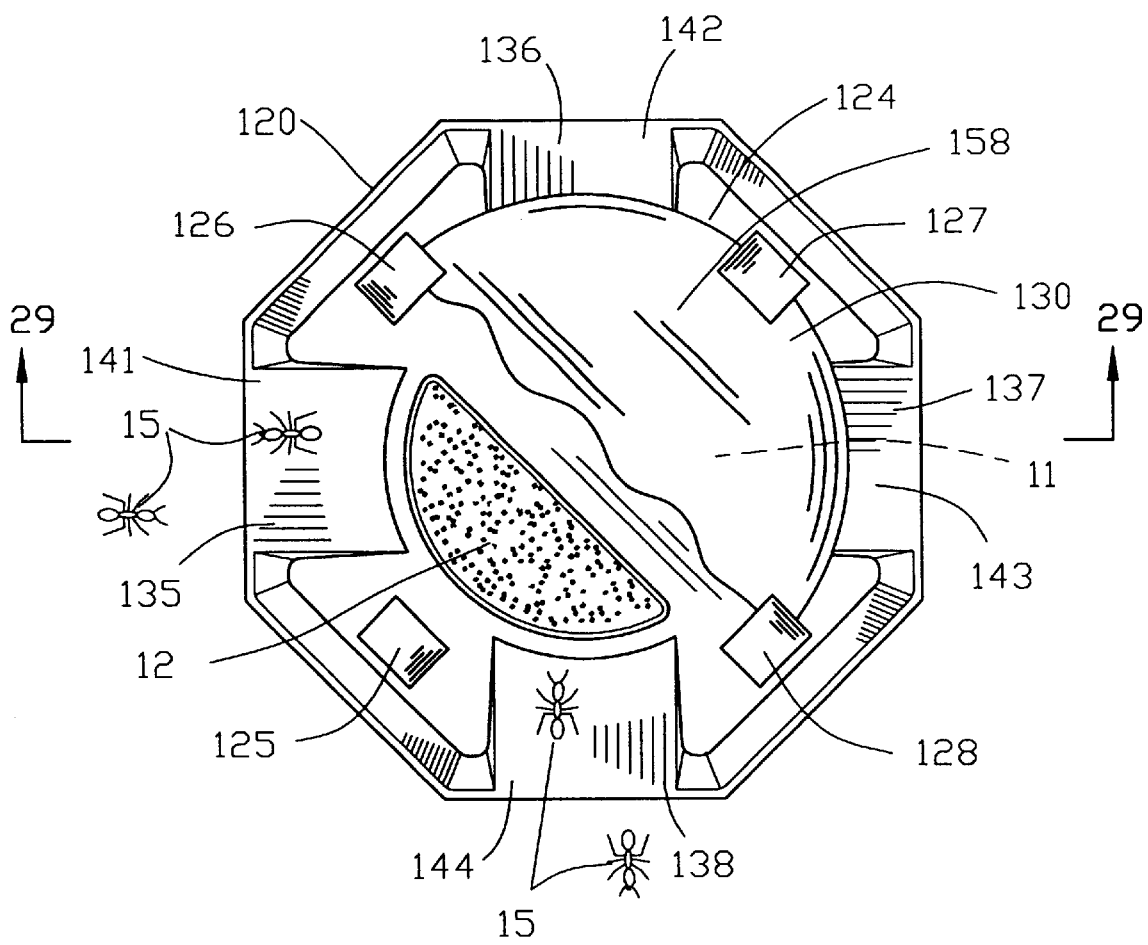
FIG. 30 is a view along line 30—30 in FIG. 29.

FIGS. 29 and 30 illustrates the third step for the subsequent delivery of the bait 11 and the poison 12 to the pest 15. The cap 130 is rotated into the rotational position shown in FIG. 29 and 30 whereat the elevated region 156 of the cap 130 cooperates with the top portion 124 of the base 120 to expose the second container 172 containing the poison 12. The lower region 158 of the cap 130 cooperates with the top portion 124 of the base 120 to cover the first container 171 containing the bait 11.

The channels 135–138 comprising inclined ramps 141–144 enable the pest 15 to migrate into the cap 130 to consume the exposed poison 12 within the second container 162. The poison 12 is shown partially consumed for delivering a large and lethal quantity of the poison 12 to the pest 15. The large and lethal quantity of the poison 12 delivered to the pest 15 is a result of the conditioning of the pest 15 to consume large quantities of the bait 11 from the first container 161.

FIGS. 31–47 are various views of a third embodiment of a device 210 for sequentially delivering of a bait 11 and a poison 12 to a pest 15. In this third embodiment of the invention, the pest 15 is shown as an ant. The device 210 comprises a base 220 supporting a cap 230.

Figure 31:
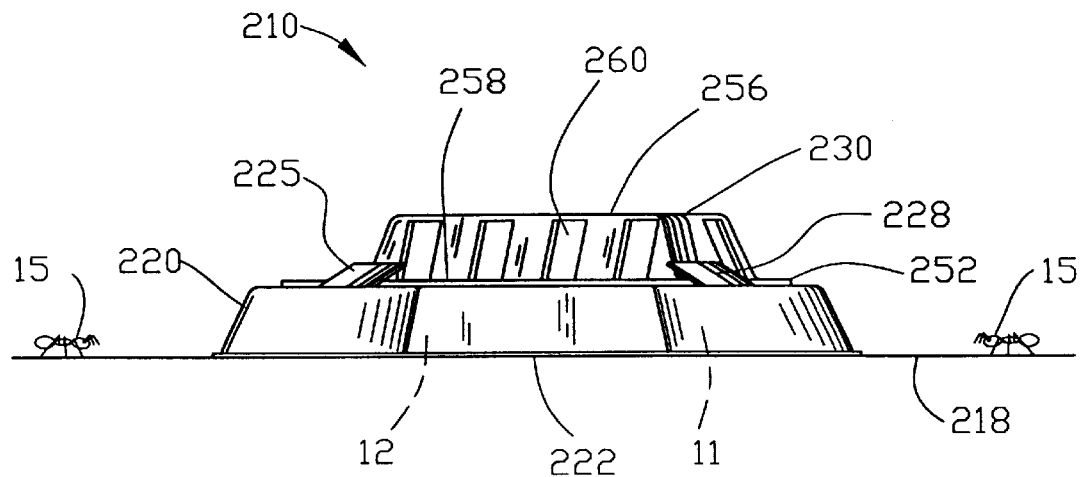
FIG. 31 is a side elevation view of a third embodiment of the invention incorporating a base and a removable cap of the present invention.
Figure 33:
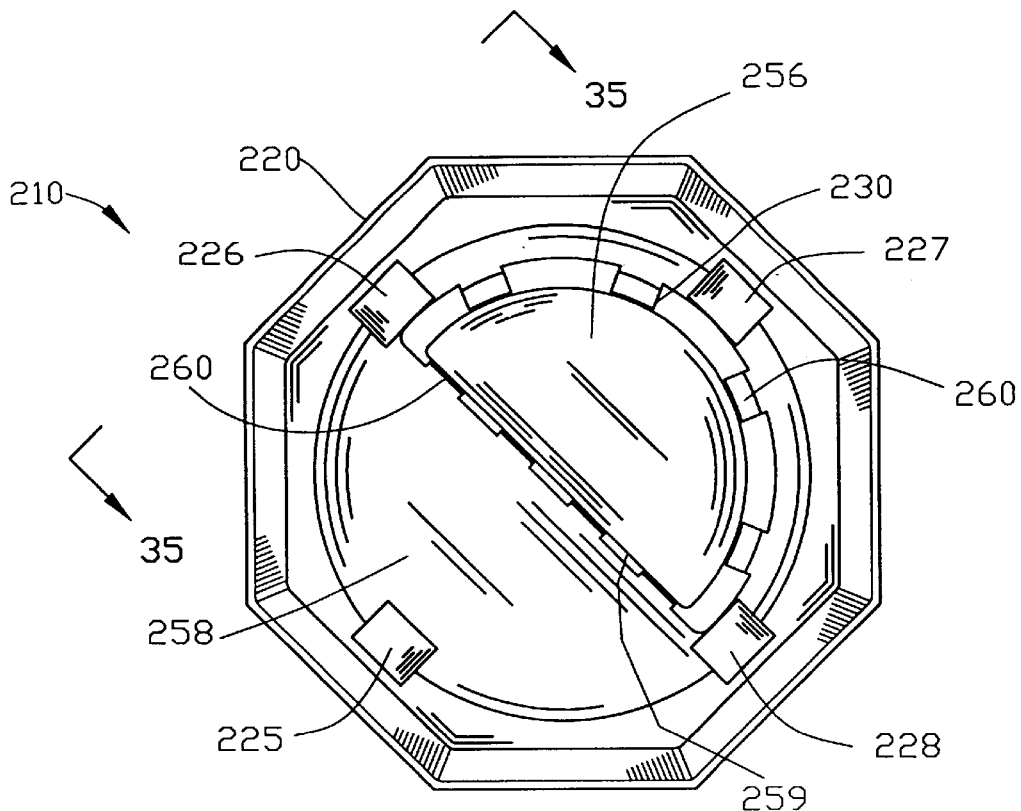
FIG. 33 is a top view of FIG. 31.

FIGS. 31 and 33 illustrate the device 210 with the base 220 supporting a cap 230. The base 220 has a lower portion 222 for resting on a surface 218 and a top portion 224. Preferably, the base 220 is formed of a unitary polymeric material through a vacuum forming process.

Figure 32:
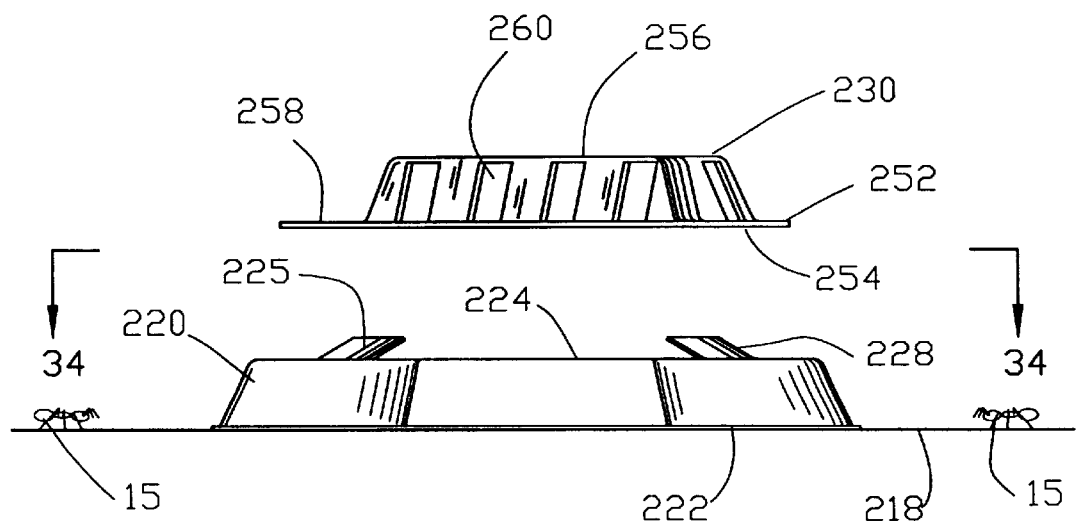
FIG. 32 is a side elevation view of the base of FIG. 31 with the removable cap being removed from the base.
Figure 34:
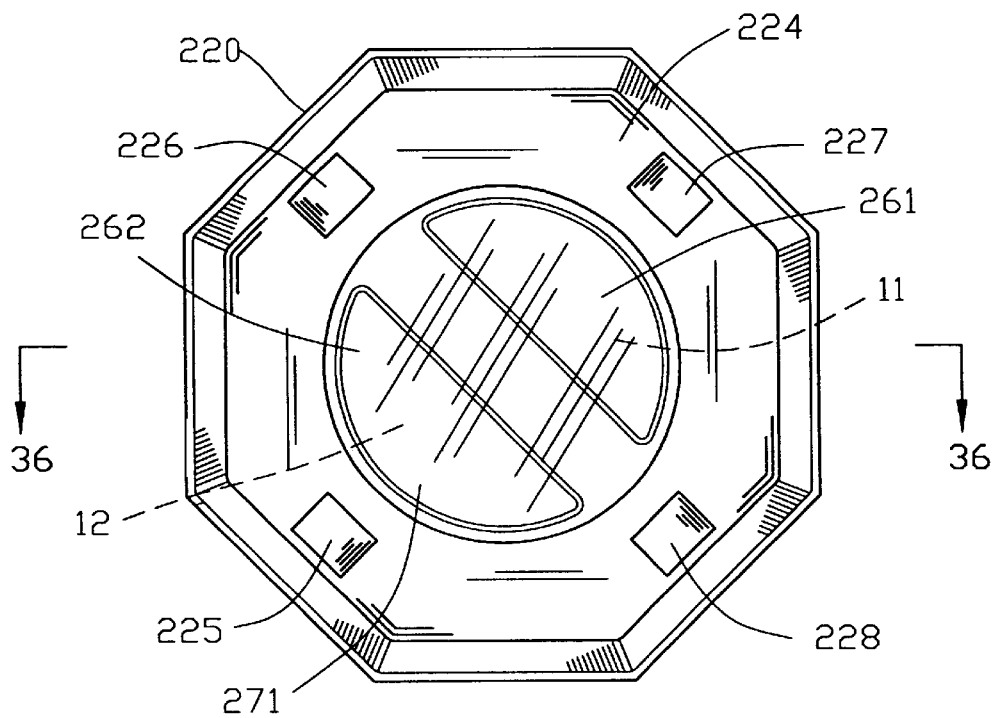
FIG. 34 is a view along line 34—34 in FIG. 32 illustrating a first and a second container with a common closure thereon.

FIGS. 32 and 34 illustrate the cap 230 removed from the base 220. In this embodiment of the invention, the cap 230 is removably mounted to the base 220. In addition, the cap 230 is rotatably mounted to the base 220.

The base 220 includes a plurality of resilient tabs 225–228 extending from a top portion 224 of the base 220 to affix the cap 230 to the base 220. The plurality of resilient tabs 225–228 may be die cut from the top portion 224 of the base 220.

The plurality of resilient tabs 225–228 resiliently deform to enable the projection 252 of the cap 230 to be engaged between the plurality of resilient tabs 225–228 and the top portion 224 of the base 220 for affixing the cap 230 to the base 220. The resiliency of the plurality of resilient tabs 225–228 enables the cap 230 to be disengaged from the plurality of resilient tabs 225–228 for removing the cap 230 from the base 220.

The plurality of resilient tabs 225–228 rotatably mount the cap 230 relative to the base 220. The cap 230 may be rotated relative to the base 220 for sequentially delivering of the bait 11 and the poison 12 to the pest 15.

Figure 35:
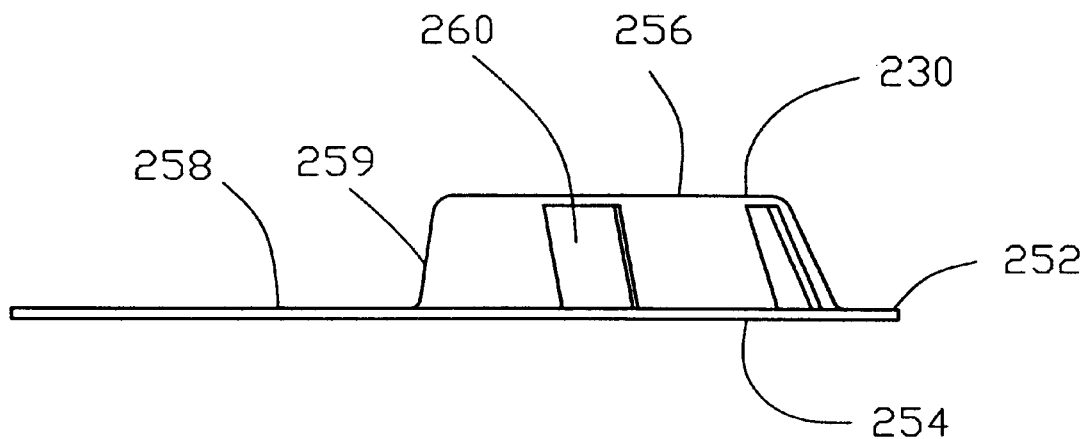
FIG. 35 is an enlarged view along line 35—35 in FIG. 33 illustrating the removable cap.

FIG. 35 is an enlarged sectional view along line 35—35 in FIG. 33 illustrating the removable cap 230. A projection 252 is defined at a bottom exterior edge 254 of the cap 230. The cap 230 includes an elevated region 256 and a lower region 258. The elevated region 256 extends at a level above the level of the bottom exterior edge 254 of the cap 230. The lower region 258 extends at a level commensurate with the level of the bottom exterior edge 254 of the cap 230. A vertical face 259 is interconnects the elevated region 256 and the lower region 258. Preferably, the cap 230 is formed of a unitary polymeric material through a vacuum forming process.

Figure 36:
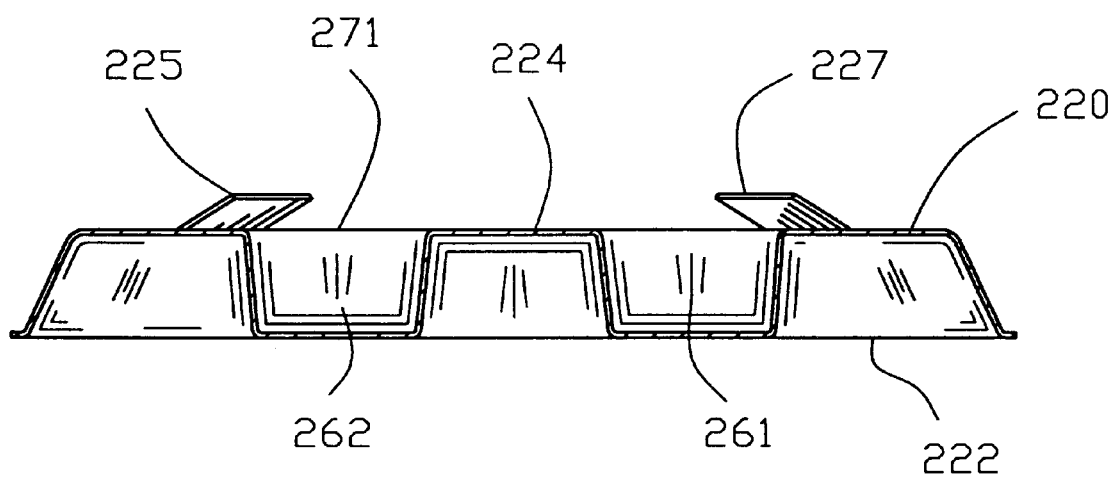
FIG. 36 is an enlarged sectional view along line 36—36 in FIG. 34 illustrating the base and the first and second containers with the common closure thereon.

FIG. 36 illustrates the base 220 supporting a first container 261 and a second container 262. The first container 261 contains a bait 11 whereas the second container 262 contains a poison 12.

The first and second containers 261 and 262 are covered by a common closure 271. The common closure 271 simultaneously conceal the bait 11 and the poison 12. Preferably, the common closure 271 is secured to the first and second containers 261 and 262 by a conventional adhesive. The conventional adhesive enables the common closure 271 to be pealed away from the first and second containers 261 and 262 to expose the content thereof. In this embodiment of the invention, the first and second containers 261 and 262 are formed integrally within the top surface 224 of the base 220.

Figure 38:
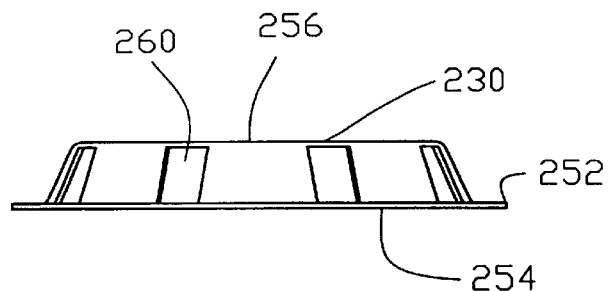
FIG. 38 is a view along line 38—38 in FIG. 37.
Figure 37:
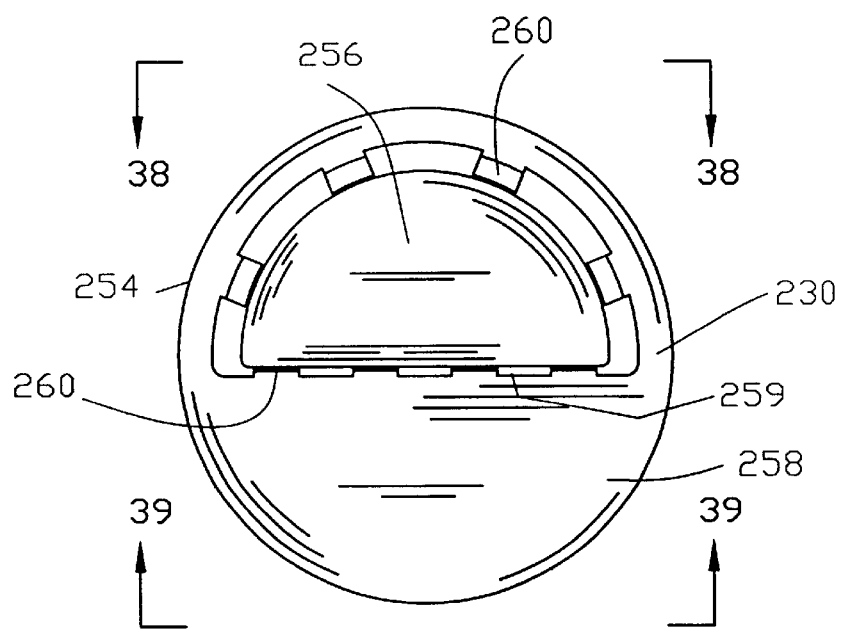
FIG. 37 is a top view of the removable cap of FIG. 31.
Figure 39:
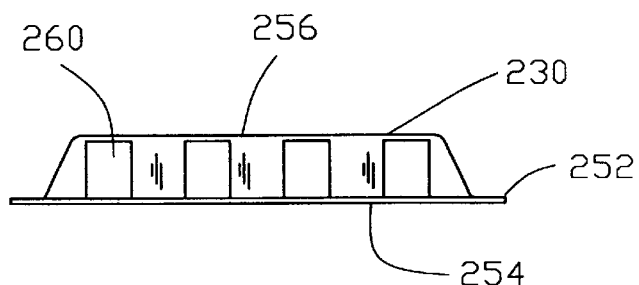
FIG. 39 is a view along line 39—39 in FIG. 37.

FIGS. 37–39 illustrate various views of the removable cap 230. In this embodiment of the invention, the elevated region 256 of the cap 230 includes a plurality of entrance apertures 260. The size of the plurality of entrance apertures 260 are selected to enable the pest 15 to pass therethrough.

The size of each of the plurality of entrance apertures 260 is selected to be suitable for the specific pest sought to be eliminated through the use of the present invention. Small entrance apertures 260 are suitable for small pests such as ants or like insects. Medium entrance apertures 260 are suitable for medium pests such as roaches or like insects. Large entrance apertures 260 are suitable for large pests such as rodents or like animals.

Figure 40:
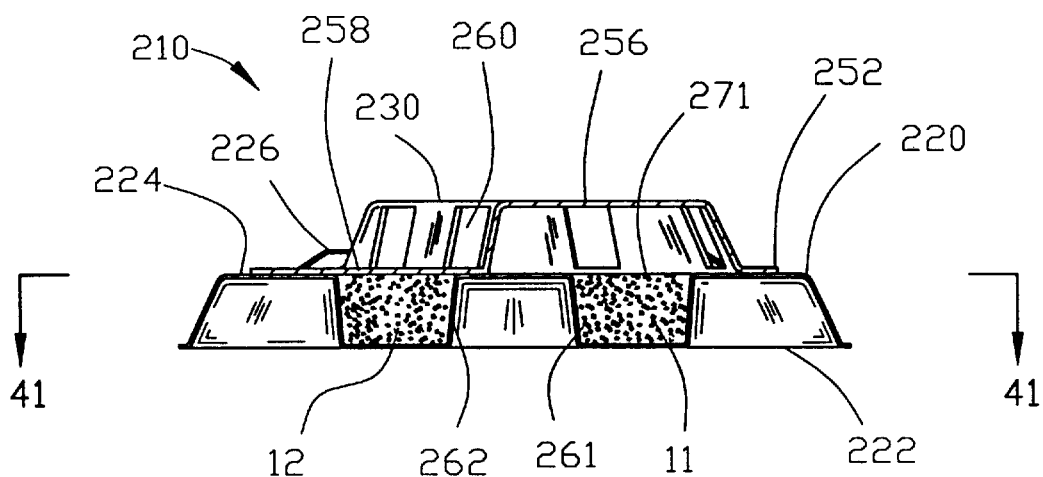
FIG. 40 is a sectional view illustrating the first container containing the bait and the second container containing the bait mixed with the poison.
Figure 41:
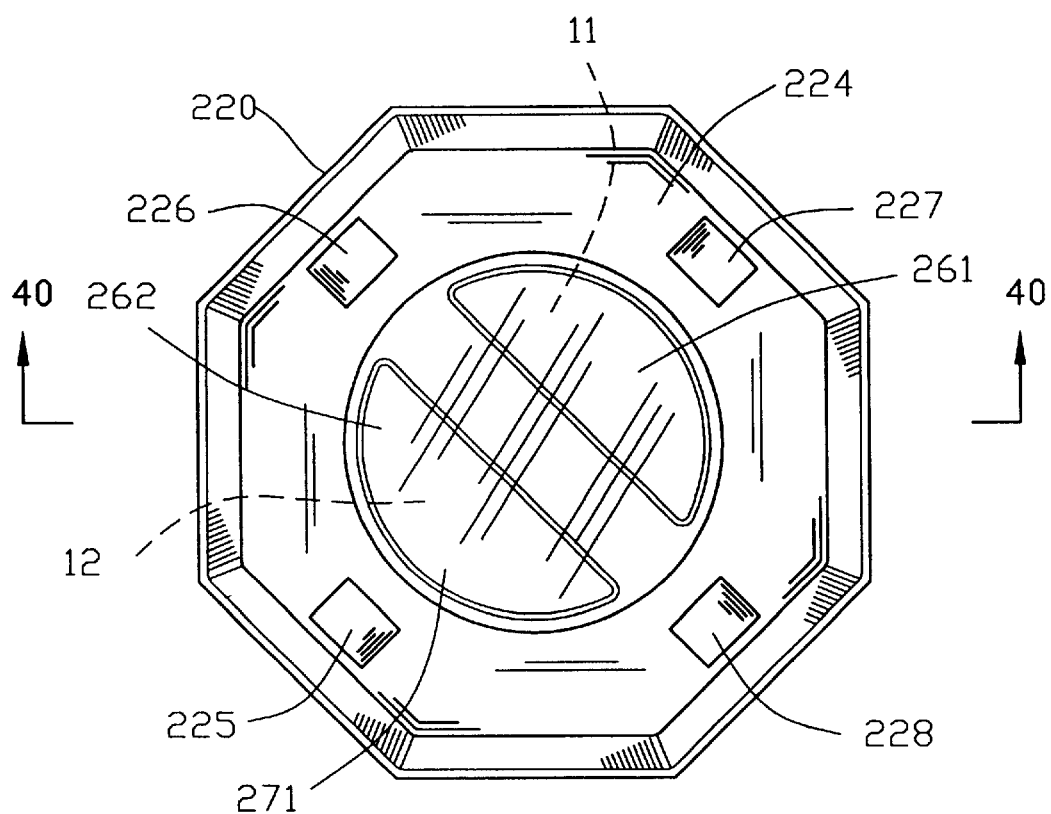
FIG. 41 is a view along line 41—41 in FIG. 40.

FIGS. 40 and 41 illustrates the cap 230 affixed to the base 220. The first container 261 contains a bait 11 whereas the second container 262 contains a poison 12. The common closure 271 is secured to the first and second containers 261 and 262.

Figure 42:
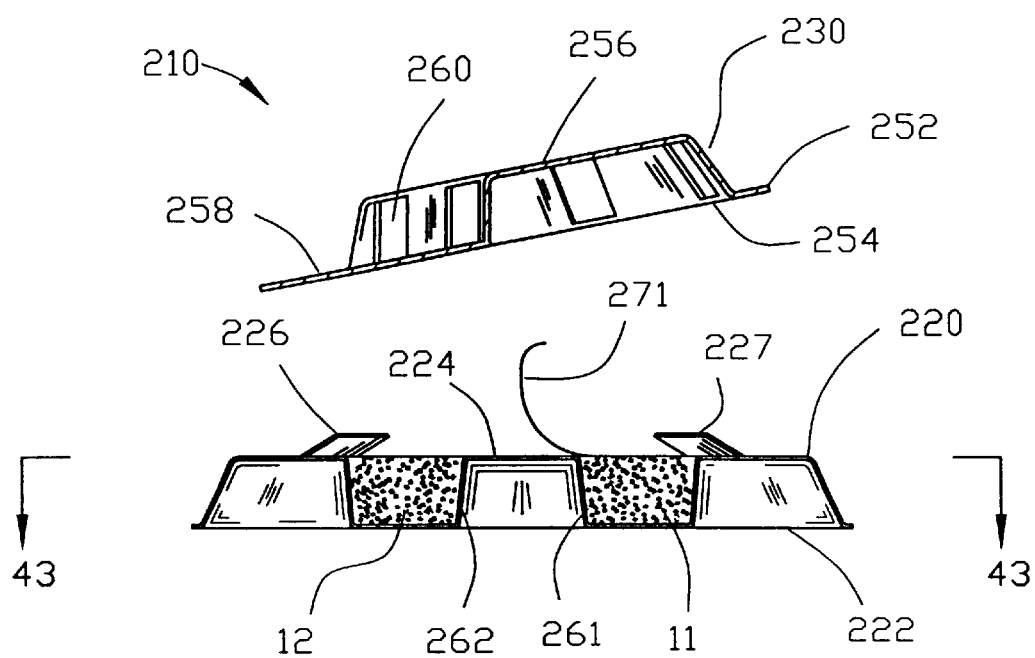
FIG. 42 is a sectional view similar to FIG. 40 illustrating the removal of the removable cap from the base and the partial pealing of the common closure from the first and second containers.
Figure 43:
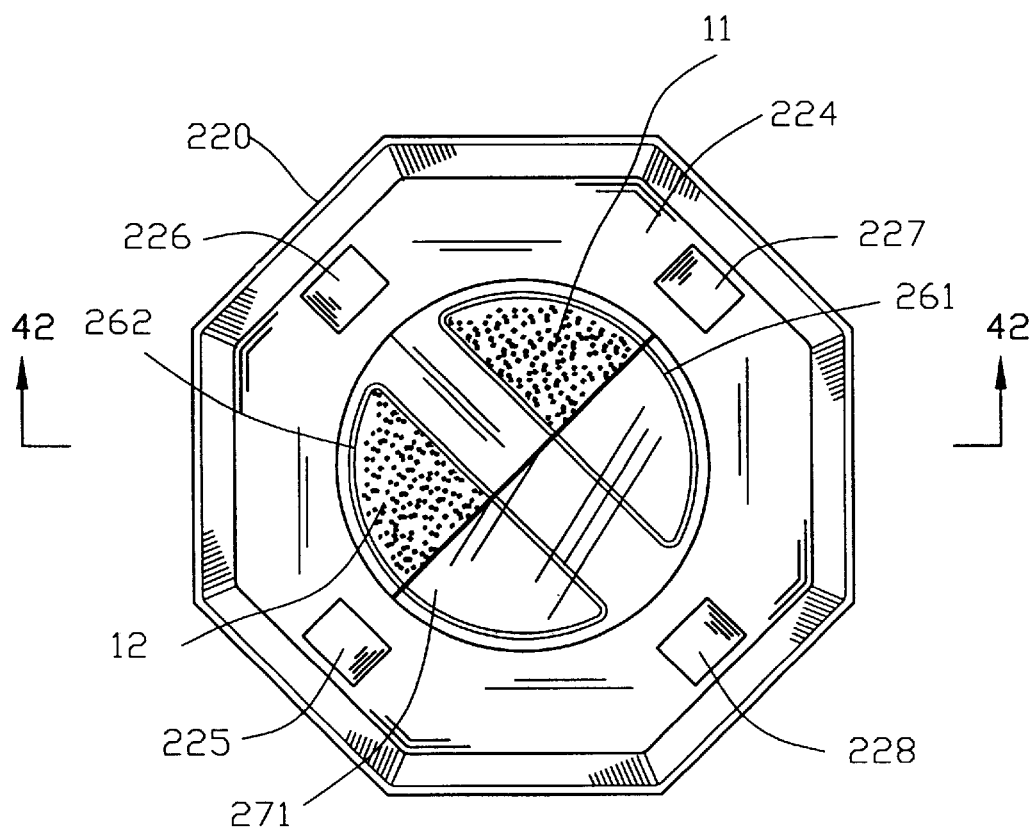
FIG. 43 is a view along line 43—43 in FIG. 42.

FIGS. 42 and 43 illustrates the first step for the subsequent delivery of the bait 11 and the poison 12 to the pest 15. The plurality of resilient tabs 225–228 are resiliently deformed to enable the projection 252 of the cap 230 to be disengaged from the plurality of resilient tabs 225–228 and the top portion 224 of the base 220 for removing the cap 230 to the base 220. After the cap 230 is removed from the base 220, the common closure 271 is pealed from the first and second containers 261 and 262. The common closure 271 is removed completely from the first and second containers 261 and 262 to expose the bait 11 and the poison within the first and second containers 261 and 262.

Figure 44:
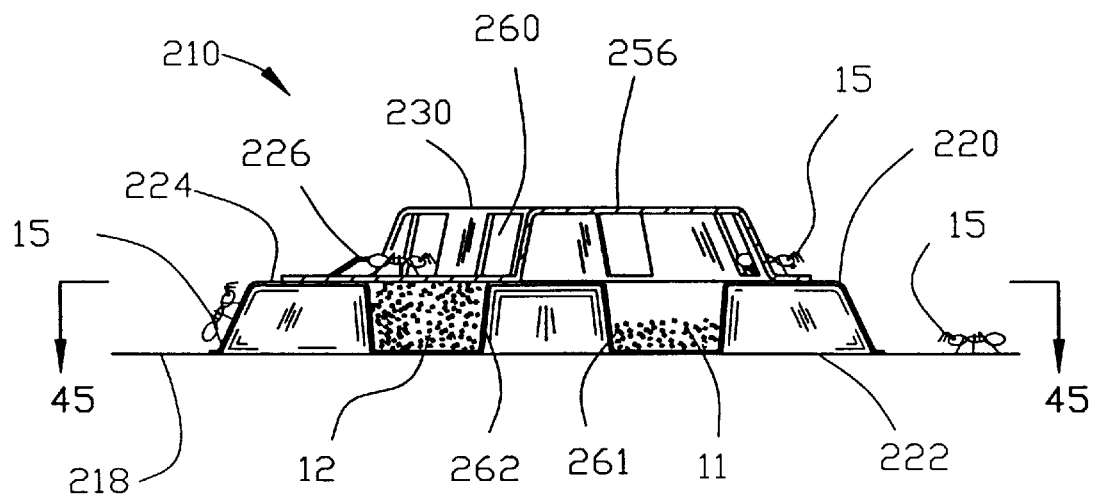
FIG. 44 is a sectional view similar to FIG. 40 illustrating the removable cap being rotated into a first position to expose the bait in the first container for attracting insects.
Figure 45:
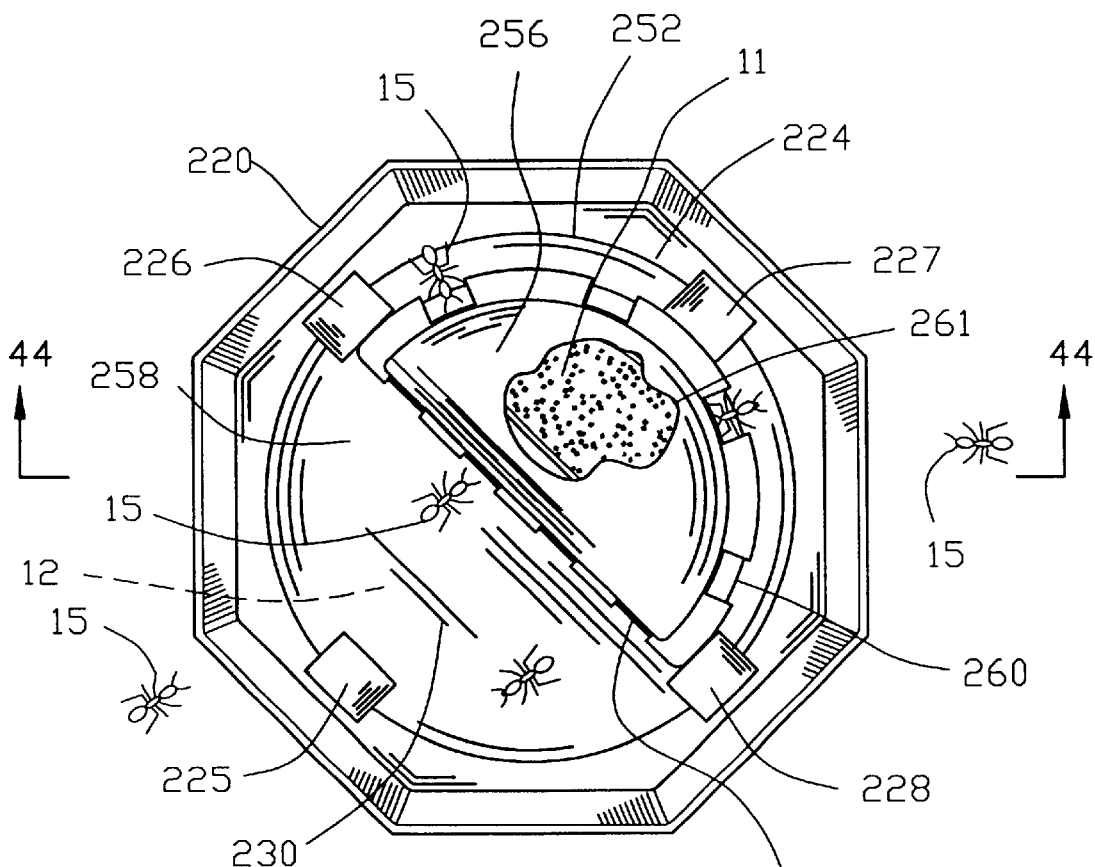
FIG. 45 is a view along line 45—45 in FIG. 44.

FIGS. 44 and 45 illustrates the second step for the subsequent delivery of the bait 11 and the poison 12 to the pest 15. The plurality of resilient tabs 225–228 are resiliently deformed to enable the projection 252 of the cap 230 to be engaged between the plurality of resilient tabs 225–228 and the top portion 224 of the base 220 for affixing the cap 230 to the base 220.

The plurality of resilient tabs 225–228 rotatably mount the cap 230 relative to the base 220. The cap 230 is rotated into the rotational position shown in FIGS. 44 and 45 whereat the elevated region 256 of the cap 230 cooperates with the top portion 224 of the base 220 to expose the first container 271 containing the bait 11. The lower region 258 of the cap 230 cooperates with the top portion 224 of the base 220 to cover the second container 272 containing the poison 12.

The entrance apertures 260 enable the pest 15 to migrate into the elevated region 256 of the cap 230 to consume the exposed bait 11 within the first container 261. The bait 11 is shown partially consumed for conditioning of the pests 15 to consume large quantities of the bait 11.

Figure 46:
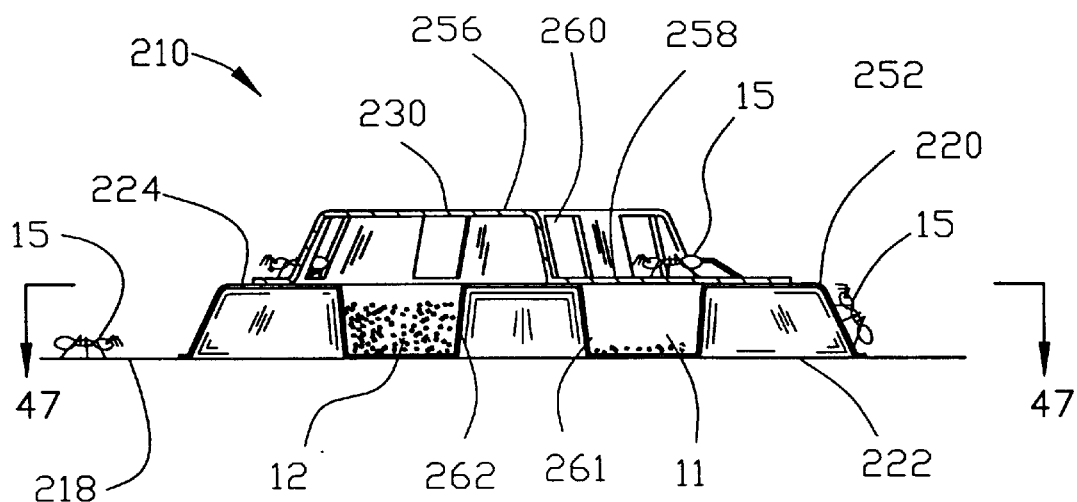
FIG. 46 is a sectional view similar to FIG. 44 illustrating the removable cap being rotated into a second position to expose the bait mixed with the poison in the second container for attracting and poisoning insects.
Figure 47:
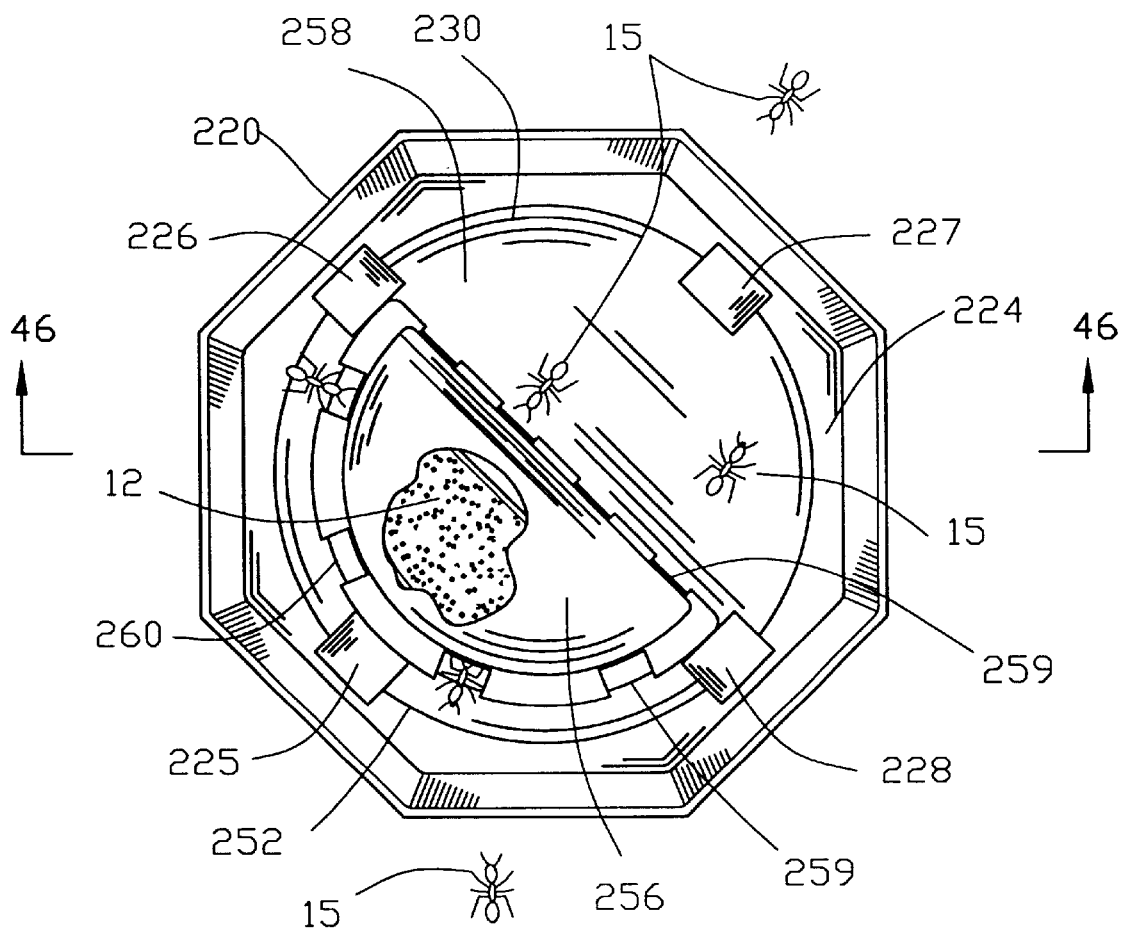
FIG. 47 is a view along line 47—47 in FIG. 46.

FIGS. 46 and 47 illustrates the third step for the subsequent delivery of the bait 11 is and the poison 12 to the pest 15. The cap 230 is rotated into the rotational position shown in FIGS. 46 and 47 whereat the elevated region 256 of the cap 230 cooperates with the top portion 224 of the base 220 to expose the second container 272 containing the poison 12. The lower region 258 of the cap 230 cooperates with the top portion 224 of the base 220 to cover the first container 271 containing the bait 11.

The entrance apertures 260 enable the pest 15 to migrate into the cap 230 to consume the exposed poison 12 within the second container 262. The poison 12 is shown partially consumed for delivering a large and lethal quantity of the poison 12 to the pest 15.

FIGS. 48–58 are various views of a fourth embodiment of a device 310 for sequentially delivering of a bait 11 and a poison 12 to a pest 15. In this fourth embodiment of the invention, the pest 15R is shown as an roach but is should be understood that the invention may be adapted for any type of insect, rodent or the like. The device 310 comprises a base 320 supporting a cap 330.

Figure 48:
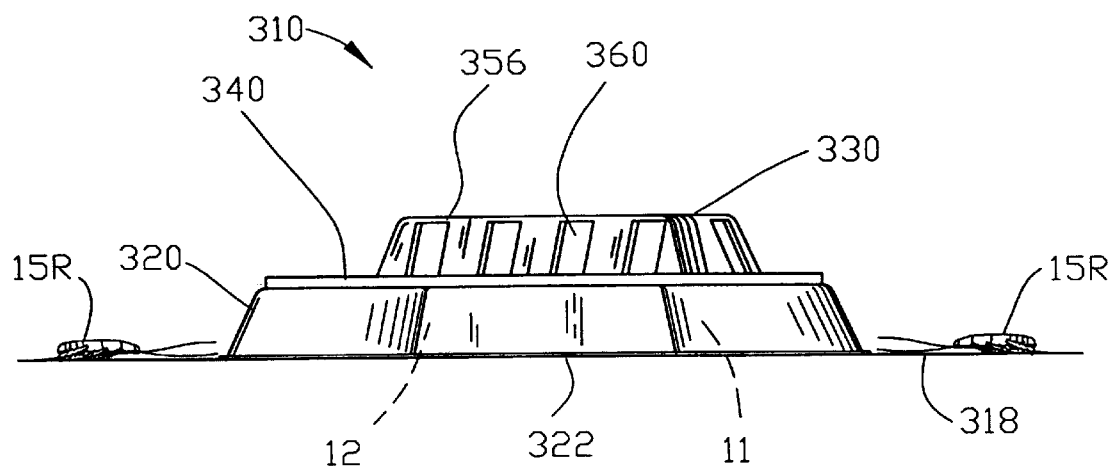
FIG. 48 is a side elevation view of a fourth embodiment of the invention incorporating a base and a rotatable cap of the present invention.
Figure 50:
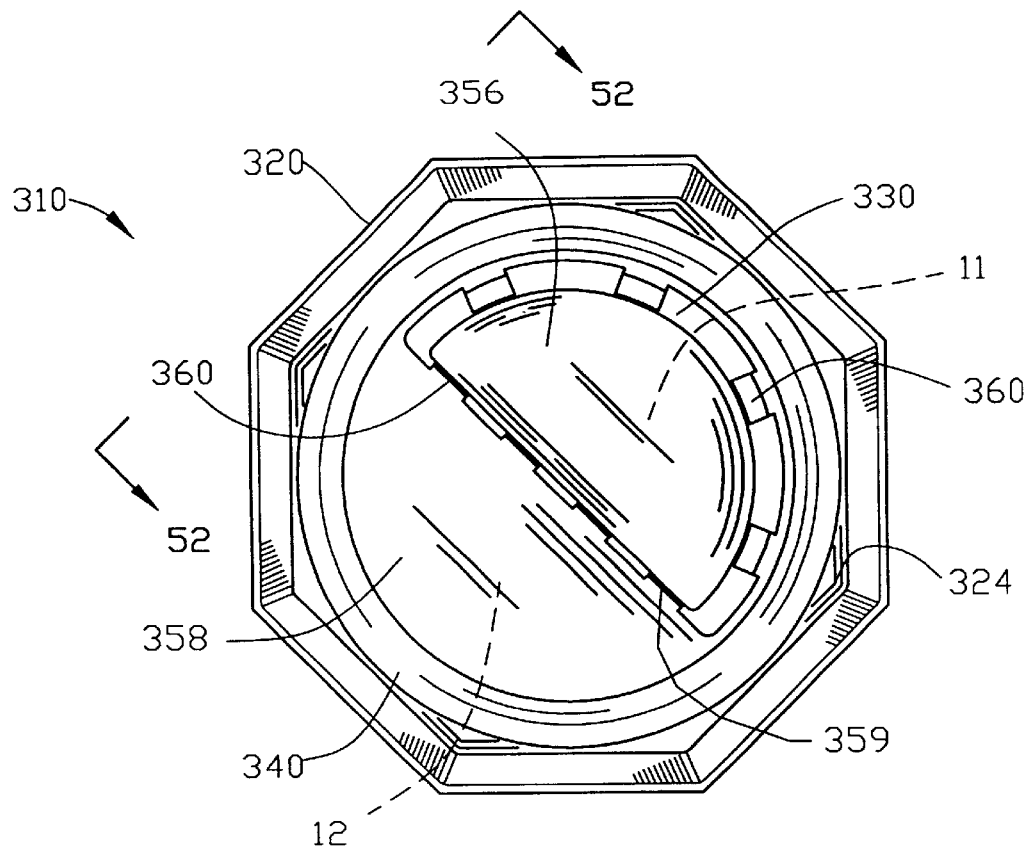
FIG. 50 is a top view of FIG. 48.

FIGS. 48 and 50 illustrate the device 310 with the base 320 supporting a cap 330. The base 320 has a lower portion 322 for resting on a surface 318 and a top portion 324.

Figure 49:
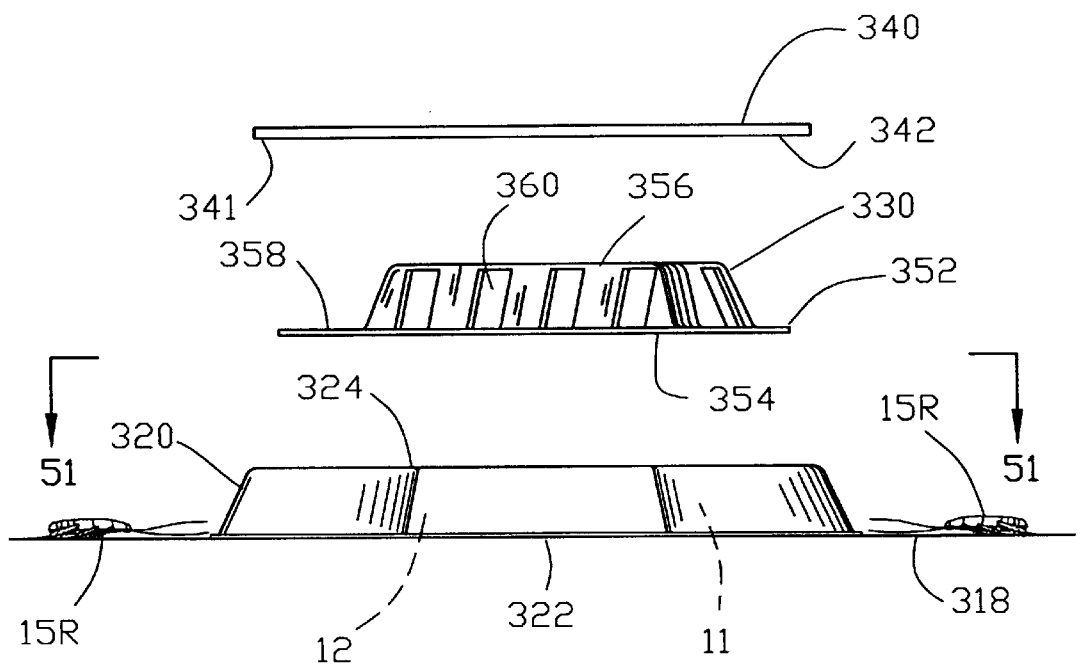
FIG. 49 is a side exploded view of the base of FIG. 48 with the rotatable cap and a mounting ring.
Figure 51:
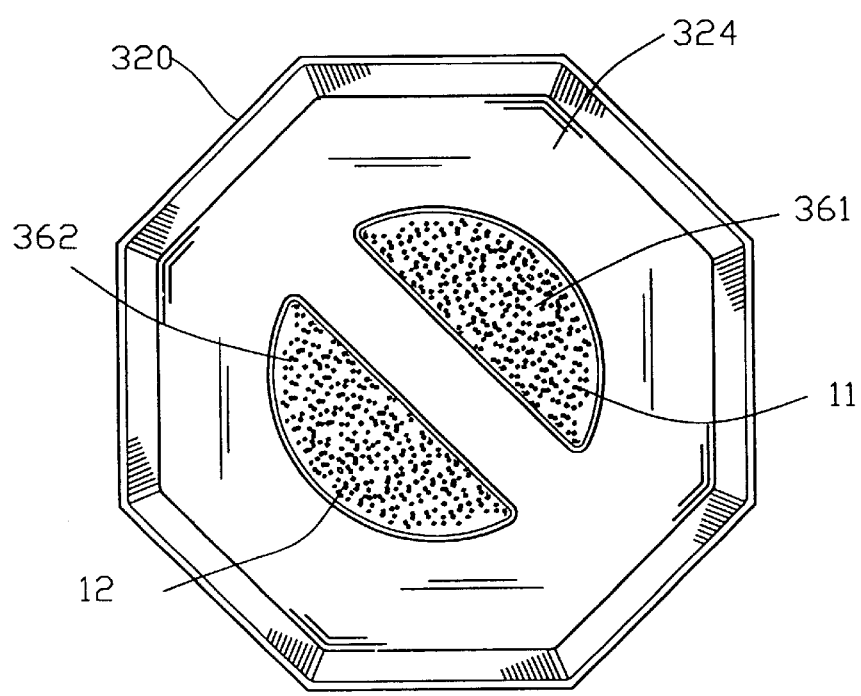
FIG. 51 is a view along line 51—51 in FIG. 49 illustrating a first and a second container.

FIGS. 49 and 51 illustrate the cap 330 removed from the base 320. In this embodiment of the invention, the cap 330 is rotatably mounted to the base 320. A mounting ring 340 rotatably mounts the cap 330 to the base 320. The cap 330 may be rotated relative to the base 320 for sequentially delivering of the bait 11 and the poison 12 to the pest 15R.

Figure 52:
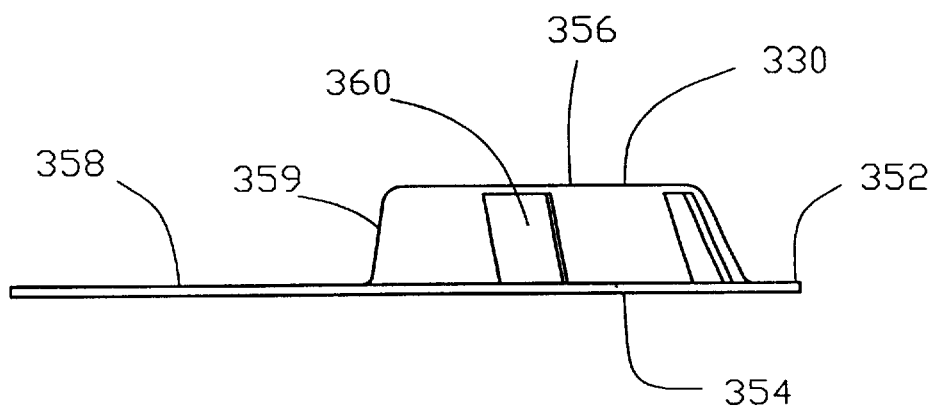
FIG. 52 is a side view of the rotatable cap of FIG. 49.

FIG. 52 is an enlarged sectional view along line 52—52 in FIG. 50 illustrating the rotatable cap 330. A projection 352 is defined at a bottom exterior edge 354 of the cap 330. The cap 330 includes an elevated region 356 and a lower region 358. The elevated region 356 extends at a level above the level of the bottom exterior edge 354 of the cap 330. The lower region 358 extends at a level commensurate with the level of the bottom exterior edge 354 of the cap 330. A vertical face 359 is interconnects the elevated region 356 and the lower region 358.

The elevated region 356 of the cap 330 includes a plurality of entrance apertures 360. The size of the plurality of entrance apertures 360 are selected to enable the pest 15R to pass therethrough.

Figure 53:
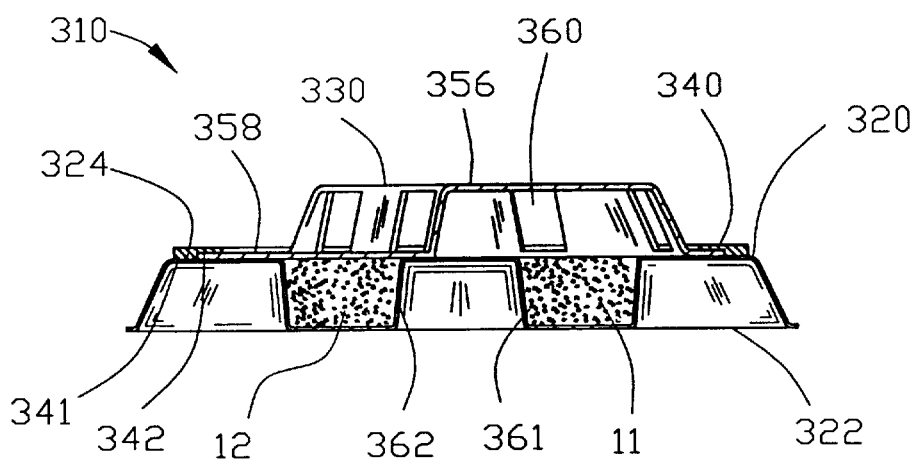
FIG. 53 is a sectional view illustrating the first container containing the bait and the second container containing the bait mixed with the poison.

FIG. 53 illustrates the base 320 supporting a first container 361 and a second container 362. The first container 361 contains a bait 11 whereas the second container 362 contains a poison 12. In this embodiment of the invention, the first and second containers 361 and 332 are formed integrally within the top surface 324 of the base 320.

Figure 54:
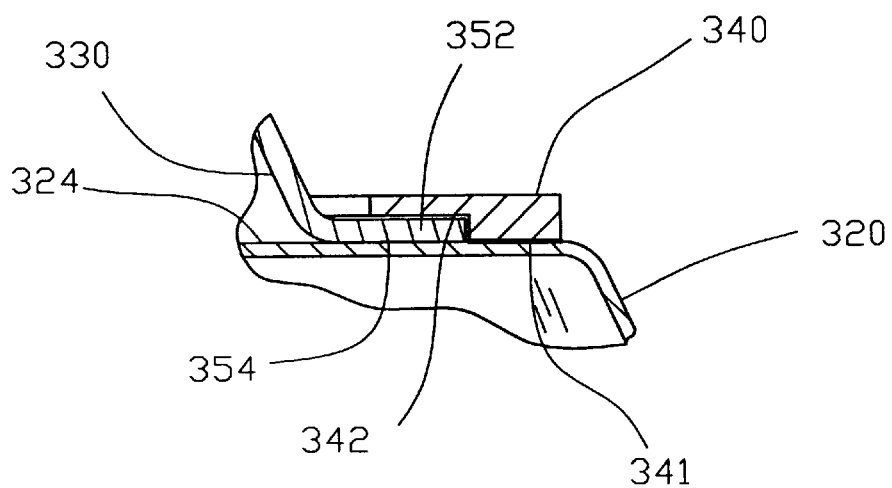
FIG. 54 is an enlarged sectional view of a portion of FIG. 53 illustrating the mounting ring securing the rotatable cap to the base.

FIG. 54 is an enlarged sectional view of a portion of FIG. 53 illustrating the mounting ring 340 securing the rotatable cap 330 to the base 320. The mounting ring 340 is shown as an annular ring having a mounting area 341 and a recessed area 342. The mounting area 341 is secured to the top portion 324 of the base 320 by suitable means such as an adhesive, sonic welding, thermo welded or any other suitable means. The recessed area 342 slidably receives the projection 352 defined at a bottom exterior edge 354 of the cap 330 for rotatably mounting the cap 330 relative to the base 320.

Figure 55:
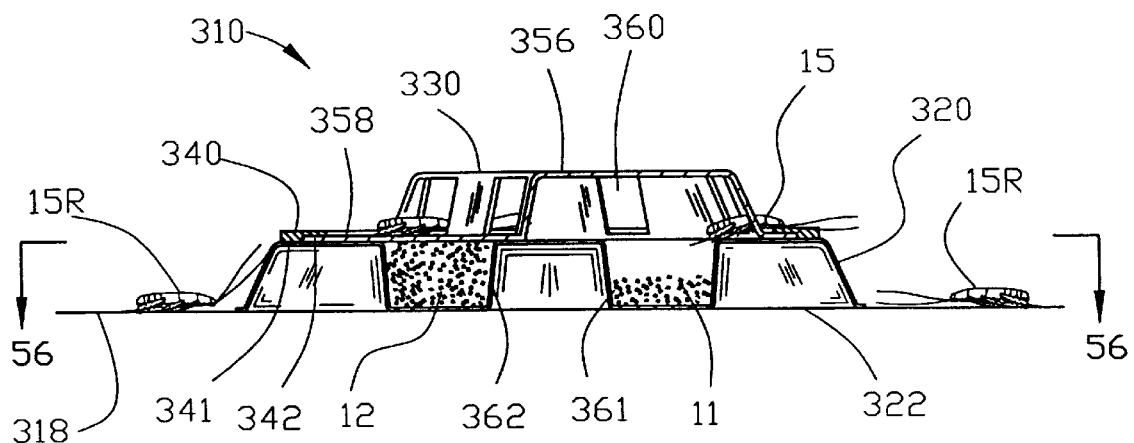
FIG. 55 is a sectional view similar to FIG. 53 illustrating the removable cap being rotated into a first position to expose the bait in the first container for attracting insects.
Figure 56:
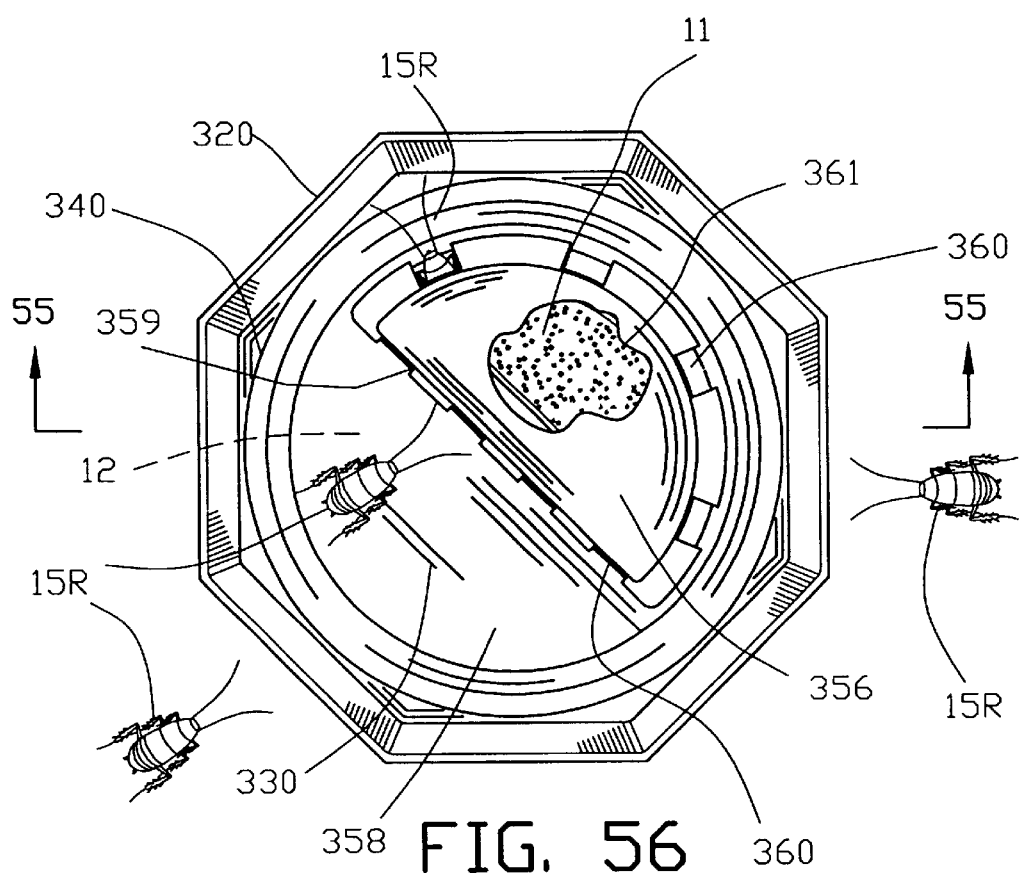
FIG. 56 is a view along line 56—56 in FIG. 55.

FIGS. 55 and 56 illustrates the first step for the subsequent delivery of the bait 11 and the poison 12 to the pest 15R. The first container 361 contains a bait 11 whereas the second container 362 contains a poison 12.

The cap 330 is rotated into the rotational position shown in FIG. 55 and 56 whereat the elevated region 356 of the cap 330 cooperates with the top portion 324 of the base 320 to expose the first container 371 containing the bait 11. The lower region 358 of the cap 330 cooperates with the top portion 324 of the base 320 to cover the second container 372 containing the poison 12.

The entrance apertures 360 enable the pest 15R to migrate into the elevated region 356 of the cap 330 to consume the exposed bait 11 within the first container 361. The bait 11 is shown partially consumed for conditioning of the pests 15R to consume large quantities of the bait 11.

Figure 57:
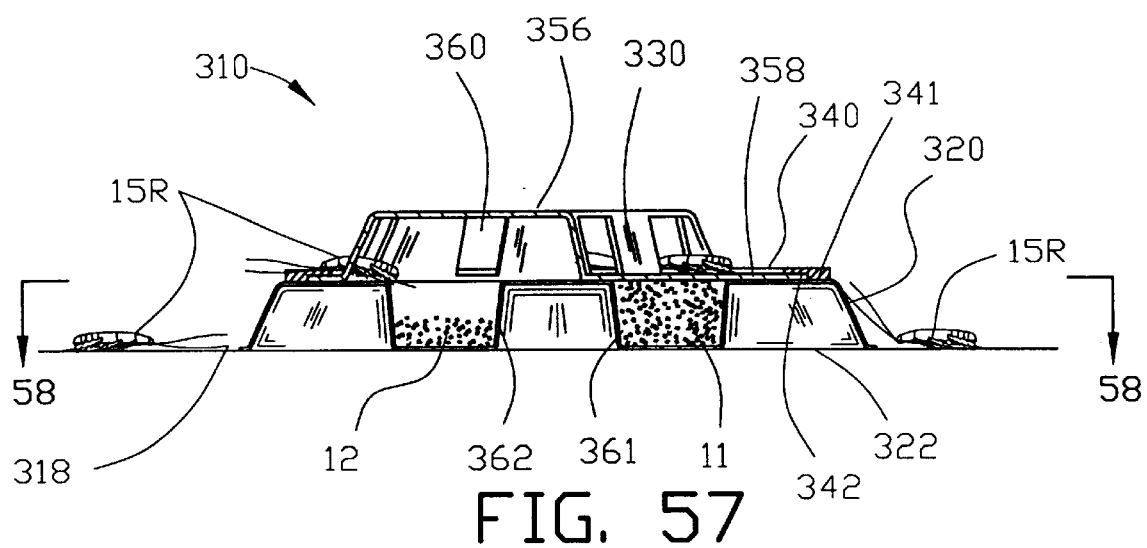
FIG. 57 is a sectional view similar to FIG. 55 illustrating the removable cap being rotated into a second position to expose the bait mixed with the poison in the second container for attracting and poisoning insects.
Figure 58:
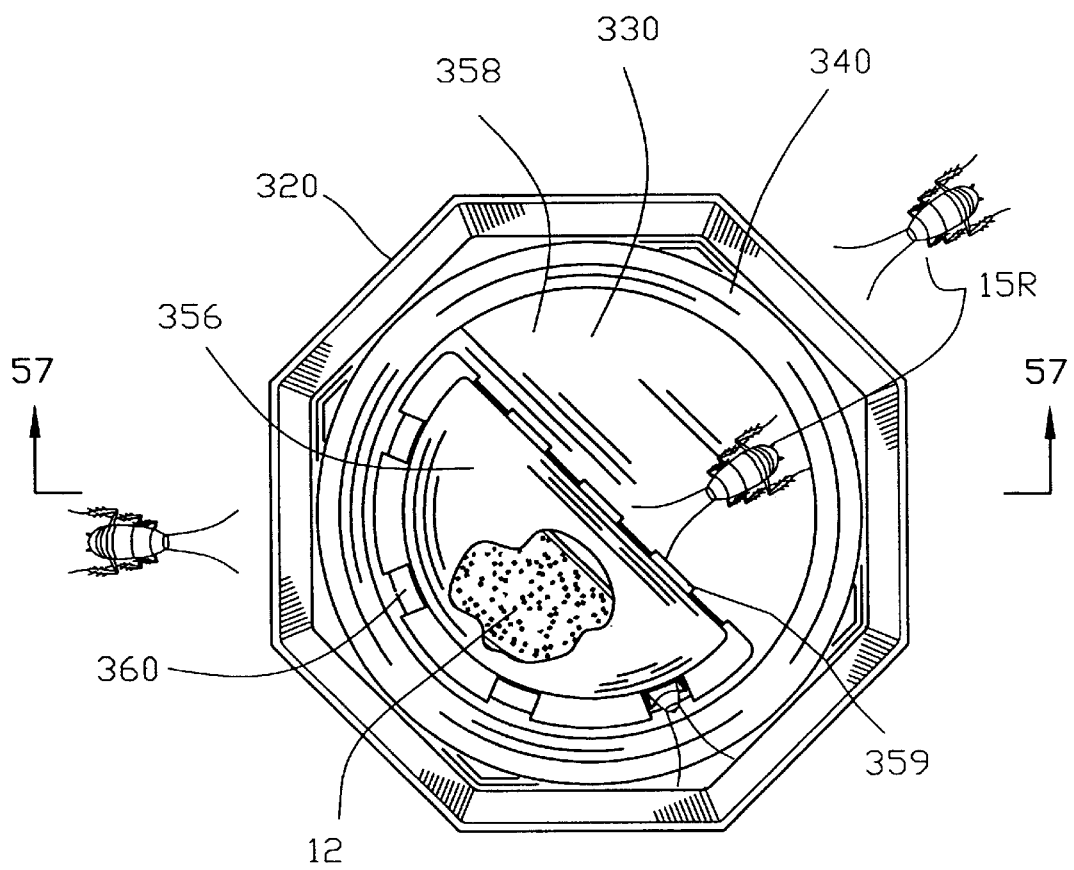
FIG. 58 is a view along line 58—58 in FIG. 57.

FIGS. 57 and 58 illustrates the second step for the subsequent delivery of the bait 11 and the poison 12 to the pest 15R. The cap 330 is rotated into the rotational position shown in FIGS. 57 and 58 whereat the elevated region 356 of the cap 330 cooperates with the top portion 324 of the base 320 to expose the second container 372 containing the poison 12. The lower region 358 of the cap 330 cooperates with the top portion 324 of the base 320 to cover the first container 371 containing the bait 11.

The entrance apertures 360 enable the pest 15R to migrate into the cap 330 to consume the exposed poison 12 within the second container 362. The poison 12 is shown partially consumed for delivering a large and lethal quantity of the poison 12 to the pest 15R.

In this embodiment of the invention, the mounting ring 340 permanently secures the rotatable cap 330 to the base 320. Accordingly, this embodiment of the invention is desirable for use to inhibit access to the interior of the cap 330 other than by the pest 15R. This embodiment of the invention may be desirable for use with potent poisons or where children or pets may come into contact with the device 310.

FIGS. 59–69 are various views of a fifth embodiment of a device 410 for sequentially delivering of a bait 11 and a poison 12 to a pest 15M. In this fifth embodiment of the invention, the pest 15M is shown as a rodent. The physical size of the device 410 may be adjusted for accommodating either rodents 15M in the form of mice or rodents in the form of rats. The device 410 comprises a base 420 supporting a cap 430.

Figure 59:
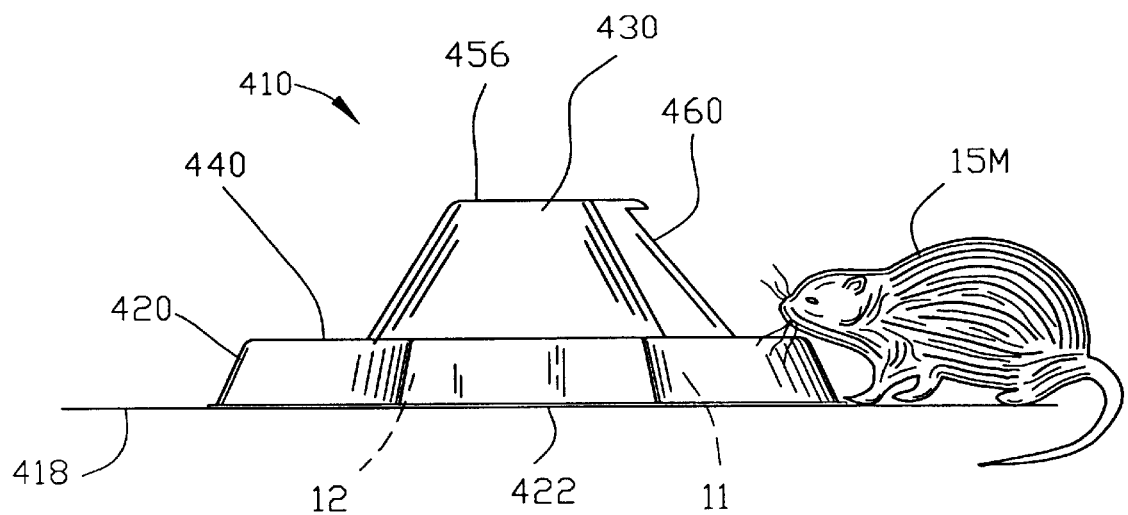
FIG. 59 is a side elevation view of a fifth embodiment of the invention incorporating a base and a rotatable cap of the present invention.
Figure 61:
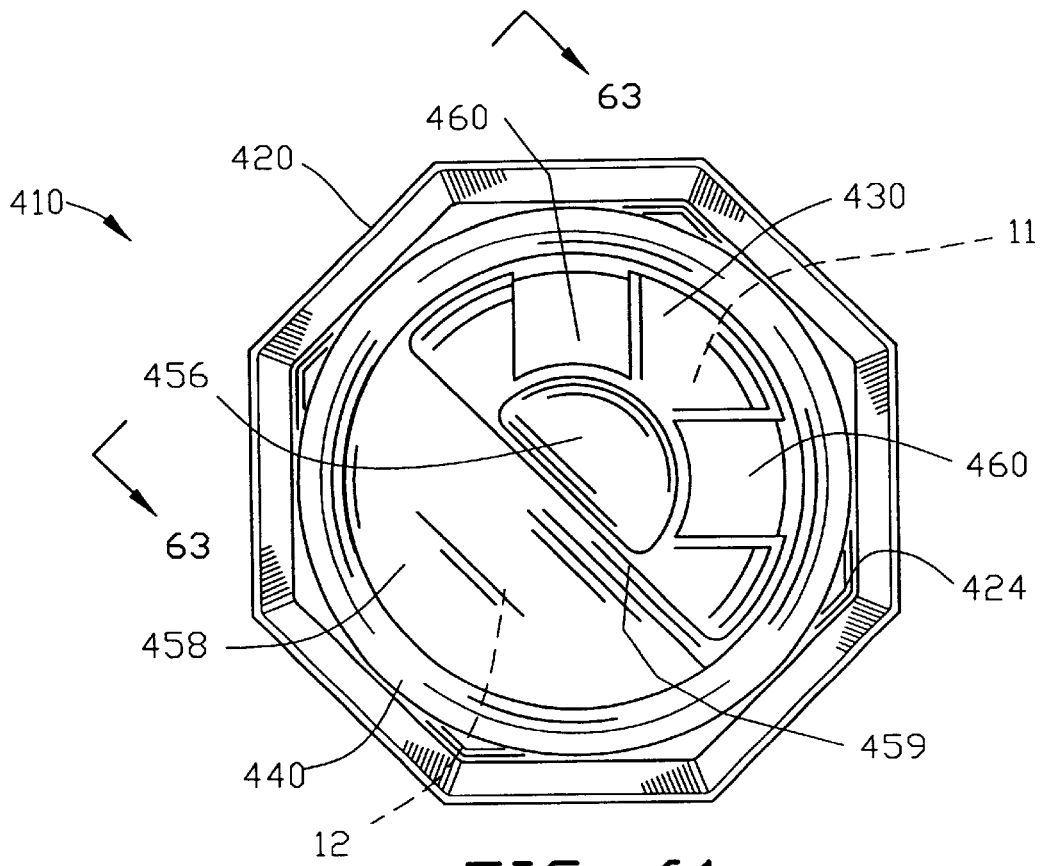
FIG. 61 is a top view of FIG. 59.

FIGS. 59 and 61 illustrate the device 410 with the base 420 supporting a cap 430. The base 420 has a lower portion 422 for resting on a surface 418 and a top portion 424. A circular recess 426 is defined in the top portion 424 of the base 420.

Figure 60:
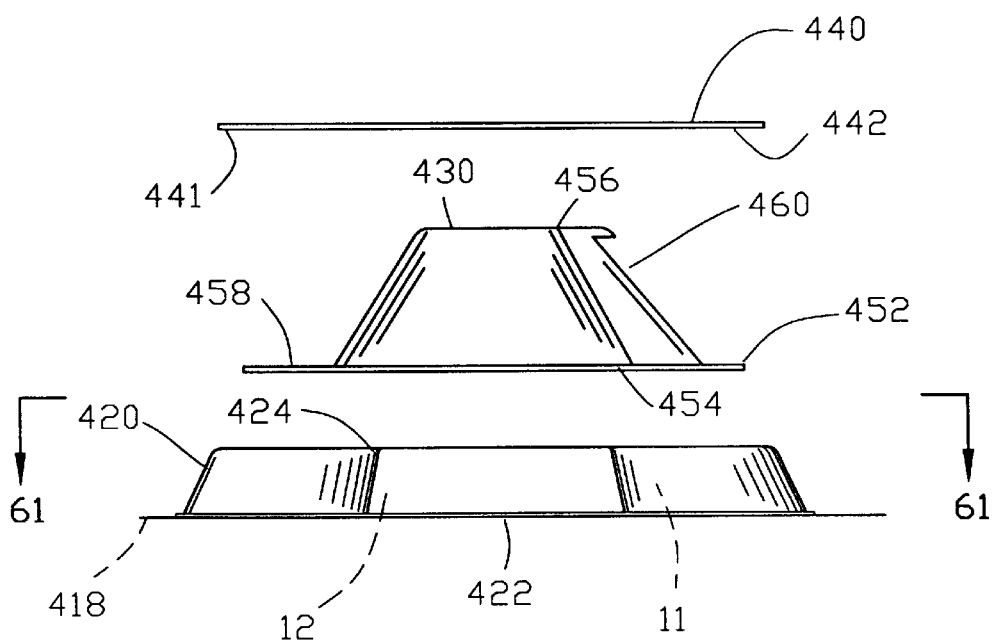
FIG. 60 is a side exploded view of the base of FIG. 59 with the rotatable cap and a mounting ring.
Figure 62:
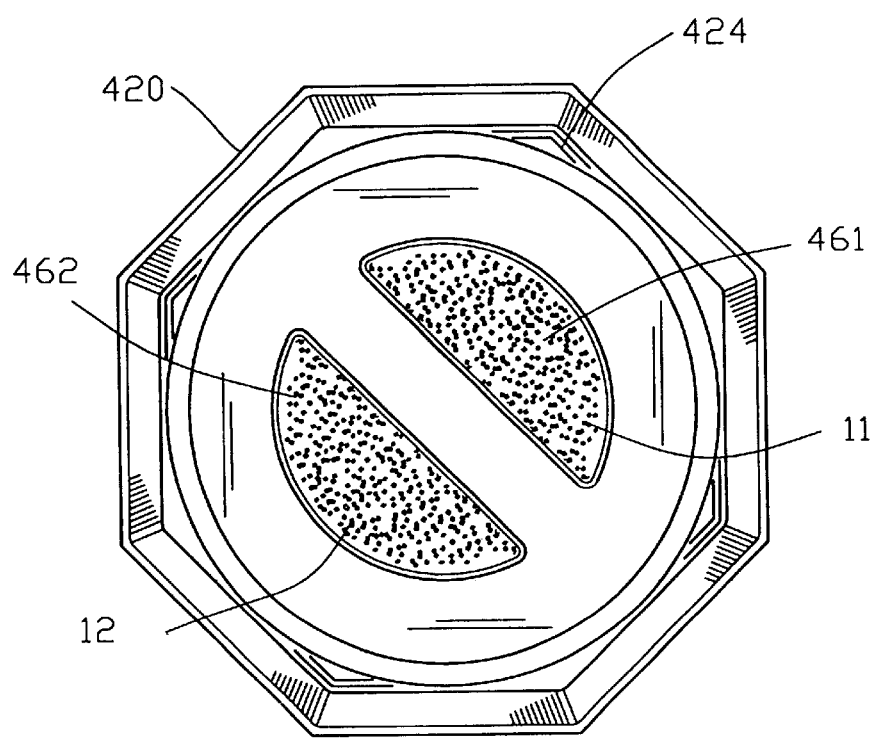
FIG. 62 is a view along line 62—62 in FIG. 61 illustrating a first and a second container.

FIGS. 60 and 62 illustrate the cap 430 removed from the base 420. In this embodiment of the invention, the cap 430 is rotatably mounted to the base 420. A mounting ring 440 rotatably mounts the cap 430 to the base 420. The cap 430 may be rotated relative to the base 420 for sequentially delivering of the bait 11 and the poison 12 to the pest 15M.

Figure 63:
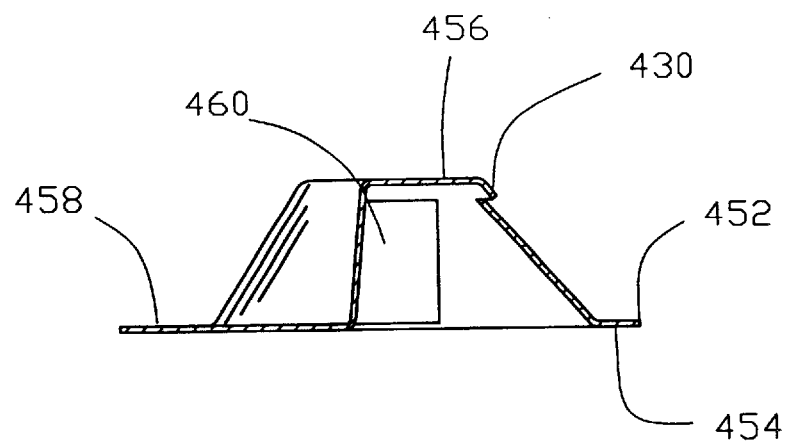
FIG. 63 is a side view of the rotatable cap of FIG. 61.

FIG. 63 is an enlarged sectional view along line 63—63 in FIG. 61 illustrating the rotatable cap 430. A projection 452 is defined at a bottom exterior edge 454 of the cap 430. The cap 430 includes an elevated region 456 and a lower region 458. The elevated region 456 extends at a level above the level of the bottom exterior edge 454 of the cap 430. The lower region 458 extends at a level commensurate with the level of the bottom exterior edge 454 of the cap 430. A vertical face 459 is interconnects the elevated region 456 and the lower region 458.

The elevated region 456 of the cap 430 includes a plurality of entrance apertures 460. The size of the plurality of entrance apertures 460 are selected to enable the pest 15M to pass therethrough.

Figure 64:
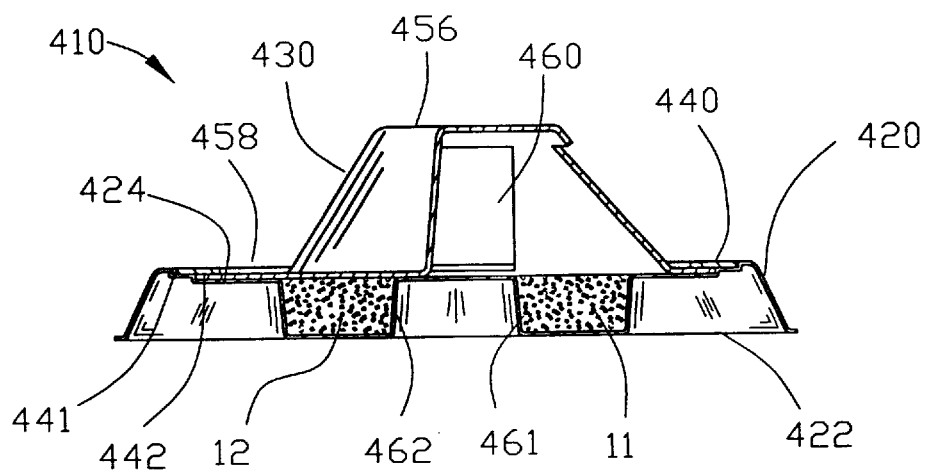
FIG. 64 is a sectional view illustrating the first container containing the bait and the second container containing the bait mixed with the poison.

FIG. 64 illustrates the base 420 supporting a first container 461 and a second container 462. The first container 461 contains the bait 11 whereas the second container 462 contains the poison 12. In this embodiment of the invention, the first and second containers 461 and 432 are formed integrally within the top surface 424 of the base 420.

Figure 65:
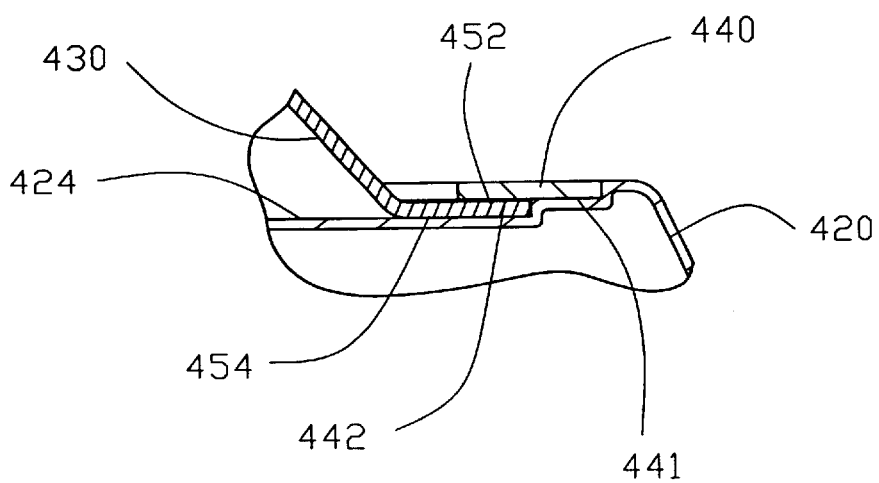
FIG. 65 is an enlarged sectional view of a portion of FIG. 64 illustrating the mounting ring securing the rotatable cap to the base.

FIG. 65 is an enlarged sectional view of a portion of FIG. 64 illustrating the mounting ring 440 securing the rotatable cap 430 to the base 420. The circular recess 426 defined in the top portion 424 of the base 420 slidably receives the projection 452 defined at a bottom exterior edge 454 of the cap 430. The circular recess 426 rotatably mounts the cap 430 relative to the base 420. The circular recess 426 automatically centers the cap 430 relative to the base 420 during the assembly process.

The mounting ring 440 is shown as an annular ring having a mounting area 441. The mounting ring 440 permanently secures the rotatable cap 430 to the base 420. The mounting area 441 is secured to the top portion 424 of the base 420 to secure the rotatable cap 430 to the base 420. Preferably, the mounting area 441 is secured to the top portion 424 of the base 420 by suitable means such as an adhesive, sonic welding, thermo welded or any other suitable means.

Figure 66:
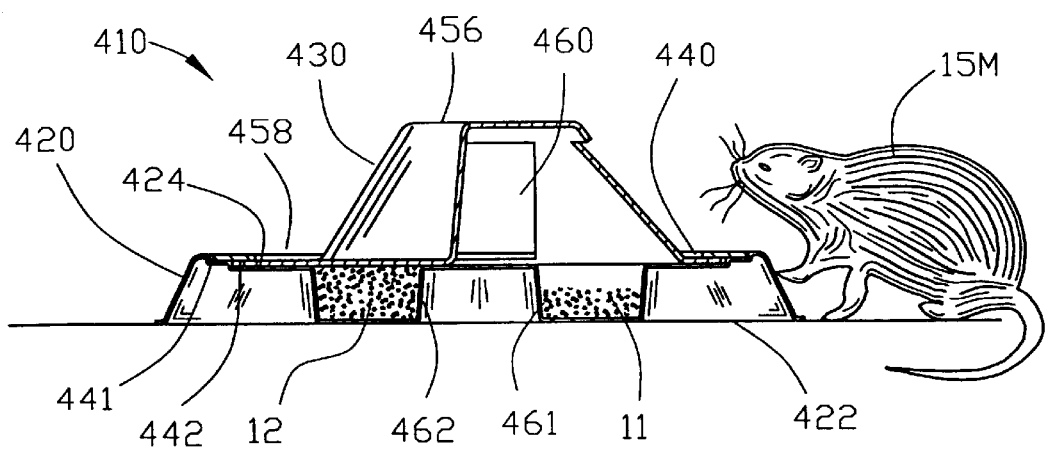
FIG. 66 is a sectional view similar to FIG. 64 illustrating the removable cap being rotated into a first position to expose the bait in the first container for attracting insects.
Figure 67:
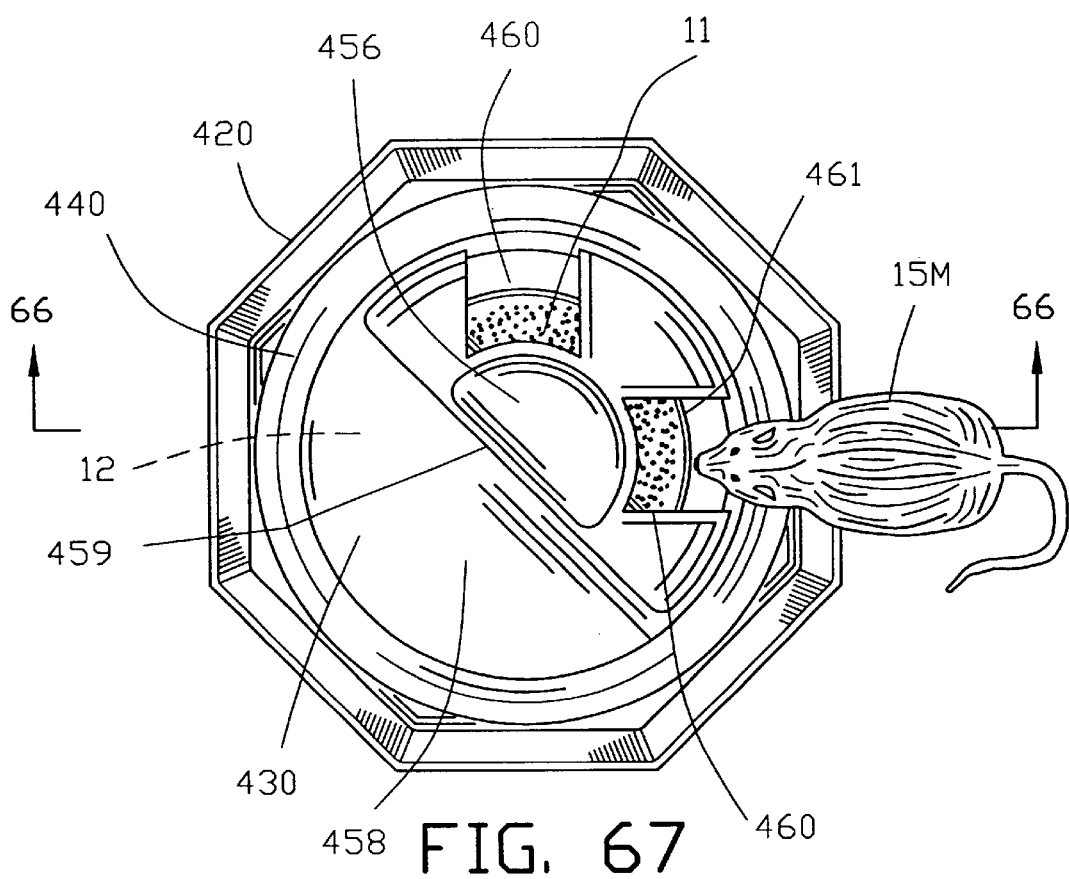
FIG. 67 is a view along line 67—67 in FIG. 66.

FIGS. 66 and 67 illustrates the first step for the subsequent delivery of the bait 11 and the poison 12 to the pest 15M. The first container 461 contains a bait 11 whereas the second container 462 contains a poison 12.

The cap 430 is rotated into the rotational position shown in FIGS. 66 and 67 whereat the elevated region 456 of the cap 430 cooperates with the top portion 424 of the base 420 to expose the first container 471 containing the bait 11. The lower region 458 of the cap 430 cooperates with the top portion 424 of the base 420 to cover the second container 472 containing the poison 12.

The entrance apertures 460 enable the pest 15M to migrate into the elevated region 456 of the cap 430 to consume the exposed bait 11 within the first container 461. The bait 11 is shown partially consumed for conditioning of the pests 15M to consume large quantities of the bait 11.

Figure 68:
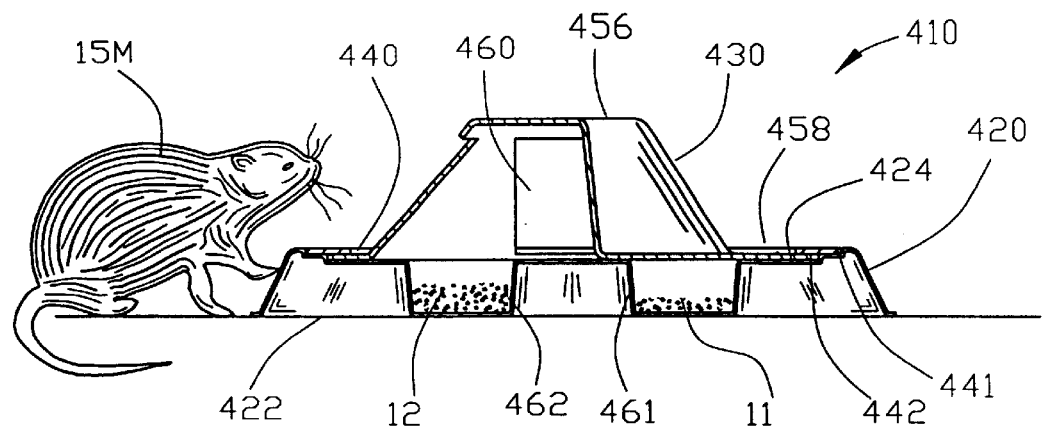
FIG. 68 is a sectional view similar to FIG. 66 illustrating the removable cap being rotated into a second position to expose the bait mixed with the poison in the second container for attracting and poisoning insects.
Figure 69:
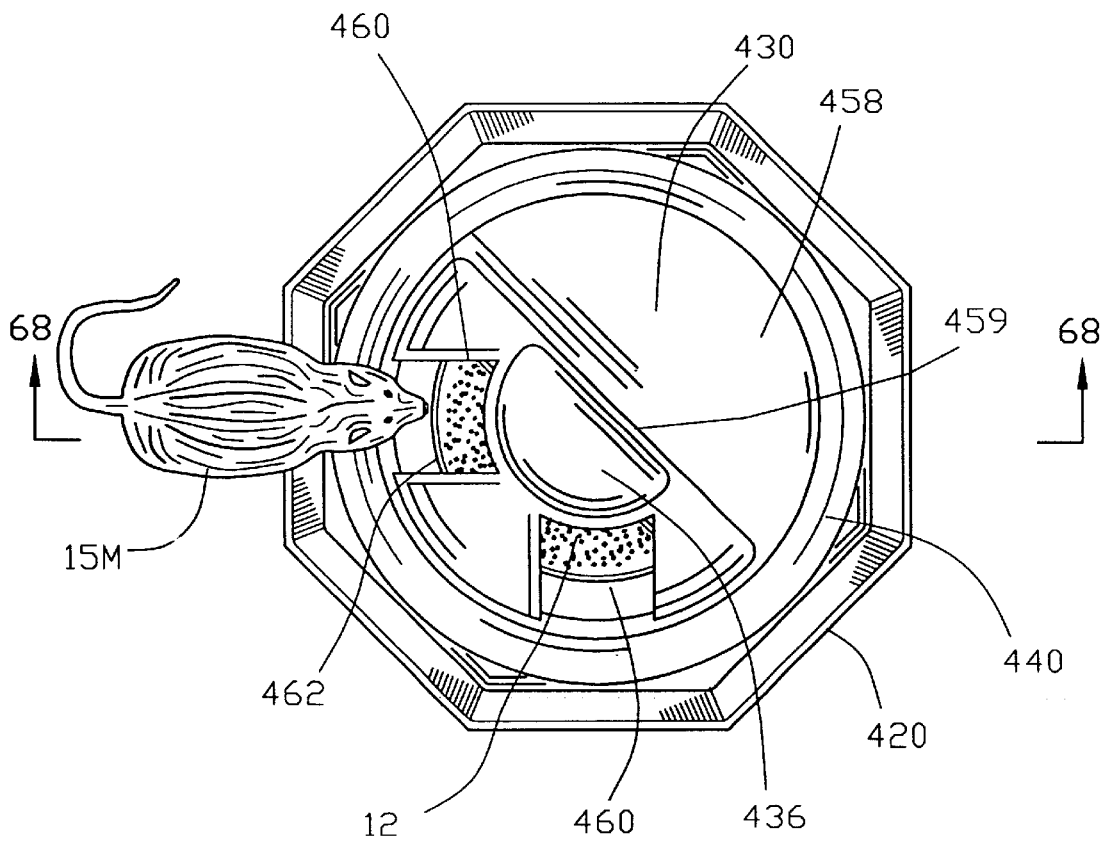
FIG. 69 is a view along line 69—69 in FIG. 68.

FIGS. 68 and 69 illustrates the second step for the subsequent delivery of the bait 11 and the poison 12 to the pest 15M. The cap 430 is rotated into the rotational position shown in FIGS. 68 and 69 whereat the elevated region 456 of the cap 430 cooperates with the top portion 424 of the base 420 to expose the second container 472 containing the poison 12. The lower region 458 of the cap 430 cooperates with the top portion 424 of the base 420 to cover the first container 471 containing the bait 11.

The entrance apertures 460 enable the pest 15M to migrate into the cap 430 to consume the exposed poison 12 within the second container 462. The poison 12 is shown partially consumed for delivering a large and lethal quantity of the poison 12 to the pest 15M.

In this embodiment of the invention, the mounting ring 440 permanently secures the rotatable cap 430 to the base 420. Accordingly, this embodiment of the invention is desirable for use to inhibit access to the interior of the cap 430 other than by the pest 15M. This embodiment of the invention may be desirable for use with potent poisons or where children or pets may come into contact with the device 410.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A device for sequentially delivering of a bait and a poison to a pest comprising:

a base having a lower portion adapted for resting on a surface;

a first and a second container portion supported by said base;

said first container adapted to include a bait;

said second container adapted to include a bait mixed with a poison;

a cap rotatably mounted to said base for movement between a first position and a second position;

said cap being rotatable to said first position for covering said second container portion and for exposing said first container portion to enable the pest to consume the bait in said first container portion; and said cap being rotatable to said second position for covering said first container portion and for exposing said second container portion to enable the pest to consume the bait mixed with a poison in said second container portion.

2. A device for sequentially delivering of a bait and a poison to a pest as set forth in claim 1, wherein said first and second containers are integrally formed with said base.

3. A device for sequentially delivering of a bait and a poison to a pest as set forth in claim 1, including a mounting ring for rotatably mounting said cap to said base.

4. A device for sequentially delivering of a bait and a poison to a pest as set forth in claim 1, including at least one channel extending through said base for enabling the pest to migrate into proximity of said first and second container portions.

5. A device for sequentially delivering of a bait and a poison to a pest as set forth in claim 1, wherein said cap includes an entrance, aperture for enabling the pest to enter therethrough.

* * * * *